US012676856B2

(12) United States Patent
Narula et al.

(10) Patent No.: US 12,676,856 B2
(45) Date of Patent: Jul. 7, 2026

(54) SYSTEM AND METHOD OF A SECURE VIRTUAL WIRELESS LEASH AT AN ENTERPRISE FOR WIRELESS PERIPHERAL DEVICES

(71) Applicant: Dell Products LP, Round Rock, TX (US)

(72) Inventors: Harpreet S. Narula, Austin, TX (US); Kai Leong Wong, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 65 days.

(21) Appl. No.: 18/648,460

(22) Filed: Apr. 28, 2024

(65) Prior Publication Data

US 2025/0337738 A1      Oct. 30, 2025

(51) Int. Cl.
| H04L 67/303 | (2022.01) |
| H04L 9/40 | (2022.01) |
| H04M 1/04 | (2006.01) |

(52) U.S. Cl.
CPC ........ H04L 63/0876 (2013.01); H04L 67/303 (2013.01); H04M 1/04 (2013.01)

(58) Field of Classification Search
CPC ... H04L 63/08; H04L 63/0876; H04L 67/303; H04M 1/04
USPC ........................................................ 726/5–7
See application file for complete search history.

(56) References Cited

U.S. PATENT DOCUMENTS

| 7,843,327 | B1 | 11/2010 | Dimartino | |
| 8,018,334 | B1 | 9/2011 | Dimartino | |

| 8,374,157 | B2 * | 2/2013 | Tamir | G06F 13/102 |
| | | | | 370/338 |
| 9,497,787 | B2 * | 11/2016 | Mostafa | H04W 8/00 |
| 10,154,367 | B2 | 12/2018 | James | |
| 10,171,984 | B2 * | 1/2019 | Vedula | H04W 8/005 |
| 10,852,828 | B1 | 12/2020 | Gatson | |
| 2003/0115395 | A1 | 6/2003 | Karcher | |
| 2010/0062833 | A1 | 3/2010 | Mattice | |
| 2015/0100715 | A1 * | 4/2015 | Huang | H04L 67/51 |
| | | | | 710/303 |

(Continued)

OTHER PUBLICATIONS

US 11,743,804 B1, 08/2023, Zanski (withdrawn)

*Primary Examiner* — Bharat Barot
(74) *Attorney, Agent, or Firm* — Prol Intellectual Property Law, PLLC; H. Kenneth Prol

(57) ABSTRACT

A docking station for leashing a wireless peripheral device to a network of an enterprise includes a docking station hardware processor, a docking station data storage device, a docking station wireless radio to wirelessly couple the docking station to an information handling system and the wireless peripheral device. The docking station hardware processor to execute computer-readable program code instructions of a docking station network characterization detection module to generate a generic attribute profile (GATT) network profile based on the detected network characteristics. The docking station hardware processor or peripheral device microcontroller to execute computer-readable program code of a leash authorization module to compare the GATT network profile to a copy of the GATT network profile stored on a data storage device of the wireless peripheral device to leash the wireless peripheral device to the docking station using the GATT network profile.

20 Claims, 6 Drawing Sheets

(56)          References Cited

U.S. PATENT DOCUMENTS

| 2015/0135021 | A1* | 5/2015 | Robison | ............... H04L 63/083 |
| | | | | 726/7 |
| 2016/0066248 | A1 | 3/2016 | Sato | |
| 2017/0064760 | A1 | 3/2017 | Kandagadla | |
| 2018/0317174 | A1 | 11/2018 | Chaubey | |
| 2021/0219095 | A1 | 7/2021 | Iyer | |
| 2022/0301410 | A1 | 9/2022 | Erdmann, IV | |
| 2023/0291243 | A1* | 9/2023 | Audet | ..................... H02J 50/40 |
| 2023/0309163 | A1* | 9/2023 | Mitty | ..................... H04L 67/63 |
| 2024/0267232 | A1* | 8/2024 | Boyapalle | ............. H04L 9/0869 |

* cited by examiner

SYSTEM AND METHOD OF A SECURE VIRTUAL WIRELESS LEASH AT AN ENTERPRISE FOR WIRELESS PERIPHERAL DEVICES

FIELD OF THE DISCLOSURE

The present disclosure generally relates to a system to operatively couple a peripheral device to a docking station within an enterprise. The present disclosure more specifically relates to a system and method to wirelessly leash a peripheral devices within a specific wireless network such at an enterprise such that the wireless peripheral device is only couplable to a docking station or other information handling system authenticated to operate within the network of an enterprise.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, gaming applications, or the like. Further, the information handling system may be operatively coupled to a system docking station which may include a radio to operatively couple or pair one or more peripheral devices to the information handling system for wireless operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
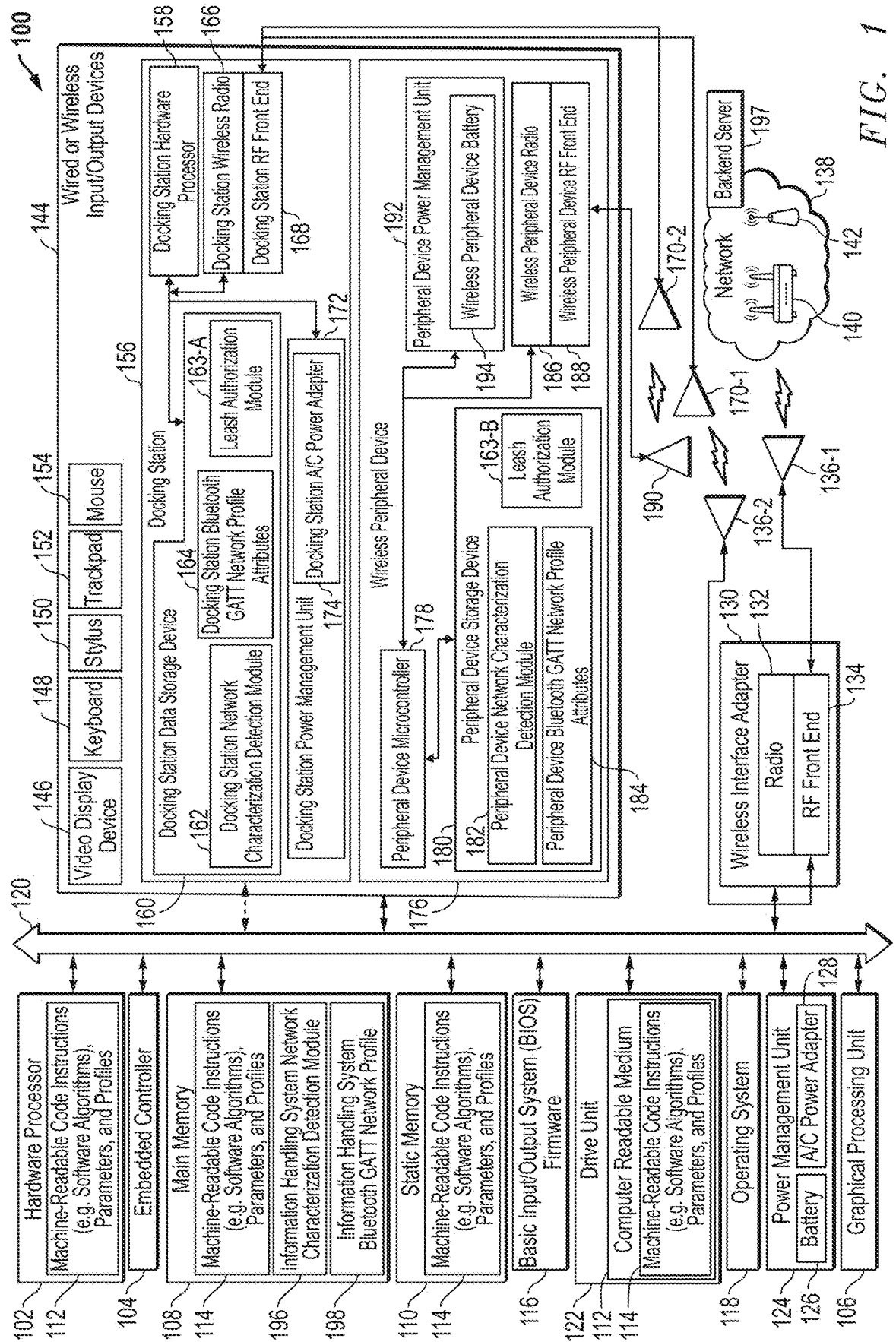
FIG. 1 is a block diagram illustrating an information handling system that may be operatively coupled to a docking station operably coupled to an enterprise network and a wireless peripheral device being only wirelessly couplable and leashed to devices operably coupled to that enterprise network according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device. This operative coupling may begin with a pairing process for pairing the peripheral device to, for example, the information handling system or a docking station with authentication of establishing wireless links for data communication under wireless protocols such as Bluetooth® and Bluetooth® Low Energy (BLE). Current pairing processes may include initiation or turning on the information handling system and peripheral device and initiating an initial communication such that confirmation and authentication pairing data may be exchanged between the peripheral device and information handling system. Some docking stations, however, may not support wireless pairing with a wireless peripheral device unless, for example, a dongle is used. These dongles, however, may require a port such as a universal serial bus (USB) port which could otherwise be used to operatively couple the docking station to other hardware peripheral devices such as an external monitor or a webcam.

Still further, the wireless peripheral devices may be stolen or otherwise displaced allowing others to use the wireless peripheral device with their own information handling systems by re-pairing the peripheral device to another host information handling system. With the universality in wireless pairing of the wireless peripheral device to any information handling system, this may increase the occurrences of theft of wireless peripheral devices by others since they are usable with any information handling system. This may be undesirable in an enterprise where plural peripheral devices and information handling systems are managed by an information technology decision maker (ITDM) or others within the enterprise to manage a fleet or group of wireless peripheral devices.

The present specification describes a docking station for leashing a wireless peripheral device to a network of an enterprise that includes nodes authenticated on that enterprise network such as the docking station or a managed client information handling system in embodiments herein. In an embodiments, one or more docking stations with wireless Bluetooth® or BLE capabilities may be used by a leashed wireless peripheral device to access and operate with the docking station and any managed client information handling systems when the wireless peripheral device can verify enterprise network credentials for authorization on the wireless network. If the enterprise network credentials cannot be verified from the leashed wireless peripheral device before pairing to a docking station or other node device in the enterprise network according to embodiments of the present disclosure, then the wireless peripheral device will not work.

In embodiments herein, a docking station may include a docking station hardware processor, a docking station data storage device, a docking station wireless radio to wirelessly couple the docking station to an information handling system and the wireless peripheral device, and a power management unit to provide power to the docking station hardware processor, the docking station data storage device, and the docking station wireless radio. The docking station hardware processor may, in an embodiment, communicate with a backend server of an enterprise via a network to establish authenticated access to the enterprise network and to detect network characteristics. In an embodiment, the docking station hardware processor may execute computer-readable program code instructions of a docking station network characterization detection module to generate a generic attribute profile (GATT) network profile based on the detected network characteristics and store the same at a data storage device at the docking station. In an embodiment, a user may pair a wireless peripheral device a first time, with standard Bluetooth® or BLE pairing techniques to the docking station having the GATT network profile and authorized in the enterprise network. In an embodiment, during the first instance when the peripheral device is paired to the docking station, the docking station hardware processor may provision a copy of the GATT network profile to be transmitted to the peripheral device with the peripheral device storing the GATT network profile on a non-volatile and persistent memory device on the peripheral device. In an alternative embodiment, after the docking station hardware processor has executed computer-readable program code of the docking station network characterization detection module and has generated the GATT network profile, the docking station may transmit a copy of the GATT network profile to a backend server. In this embodiment, the backend server may maintain a listing of GATT network profiles associated with a plurality of enterprise networks such that where an internet technology decision maker (ITDM) purchases a peripheral device on behalf of a user of a given enterprise network, a manufacturer of the peripheral device may upload the copy of the GATT network profile to the non-volatile and persistent memory device on the peripheral device in preparation for pairing and operative coupling of the peripheral device to a node within the enterprise network such as the docking station. In yet another alternative embodiment, the ITDM may receive the shipped peripheral device and cause a copy of the GATT network profile to be provisioned and uploaded to the non-volatile and persistent memory device on the peripheral device prior to the user turning on the peripheral device and the initialization of the Bluetooth® or BLE pairing process between the peripheral device and the network node (e.g., the docking station).

In an embodiment, where the peripheral device is received and first initiated by the user or an ITDM, the docking station hardware processor may provide instructions to a hardware microcontroller of the peripheral device to execute a leash authorization module that requires the peripheral device to authenticate itself via the GATT network profile. The execution of the leash authorization module leashes the peripheral device to the enterprise network to (which the docking station is a part of) such that the peripheral device cannot provide human interface device (HID) input to any other information handling system or other node that is not operatively coupled to the enterprise network or has a GATT network profile. As such, where the GATT authorization profile stored on the non-volatile and persistent memory device on the peripheral device does not match the GATT network profile stored on a docking station data storage device, the peripheral device microcontroller, executing computer-readable program code instructions of the leash authorization module, is prevented from being Bluetooth® or BLE operably coupled to the network device and prevented from providing HID input.

In an embodiment, any subsequent request by the docking station hardware processor, executing code instructions of a leash authorization module, to transmit a request to connect with the wireless peripheral device causes the docking hardware processor to compare the GATT network profile stored on the docking station with a copy of the GATT network profile transmitted from a non-volatile memory storage device of the wireless peripheral device. According to embodiments herein, when the GATT network profile stored at the docking station or other enterprise network node matches the wireless peripheral device-stored GATT network profile, the docking station hardware processor authorizes Bluetooth® or BLE operative coupling of the docking station to the wireless peripheral device such that the wireless peripheral device is allowed to provide HID input to the docking station. Thus, the docking station hardware processor may execute code instructions of the leash authorization module to transmit instructions to the wireless peripheral device directing that the wireless peripheral device be leashed the docking station such that the wireless peripheral device can only wirelessly connect and only perform HID operations with a node operatively coupled to the network in an embodiment.

In an embodiment, the detected network characteristics including a domain name and network server gateway address associated with the network and a hardware identification of the docking station. This data may be used to develop the GATT network profile. Copies of this GATT network profile may also be stored on a non-volatile and protected data storage device on the wireless peripheral device and the information handling system for later verification by the docking station hardware processor to operatively couple the wireless peripheral device to the docking station securely and to permit the wireless peripheral device to pair and wirelessly couple under the Bluetooth® or BLE protocol. This allows the wireless peripheral device to be leashed to a specific enterprise which may include a group of servers and network devices such as backend servers, access points, base stations, and the like that are associated with a specific business or organization.

In an embodiment, the information handling system may be used to operatively couple the docking station to the network in order to obtain the network characteristics. In an embodiment, the docking station hardware processor may establish a wireless connection with the enterprise network via the information handling system such that the information handling system, on behalf of the docking station, detects network characteristics and provides that data to the docking station.

In an embodiment, the docking station may provision the GATT network profile to other devices. For example, the docking station hardware processor may communicate the GATT network profile to the backend server for the backend server to provision this GATT network profile to a manufacturer of the wireless peripheral device. In an embodiment, the manufacturer may upload a copy of the GATT network profile to the non-volatile data storage device of the peripheral device at a factory where the wireless peripheral device is manufactured.

It is appreciated that, in some embodiments, a leashed wireless peripheral device that could be paired with the docking station must include a copy of the GATT network profile to be permitted to operatively couple with or pair with the docking station or any other node in the enterprise network. Computer readable code instructions of a leash authorization agent installed on the wireless peripheral device will limit or leash operations of the wireless peripheral device at the pairing stage to only pair with docking stations or device nodes when the wireless peripheral device-stored GATT network profile matches the candidate docking station or other device node having GATT network profile indicating enterprise network credential authorization to pair or wirelessly transmit. In this embodiment, when the GATT network profile does not match the wireless peripheral device-stored GATT network profile, the docking station hardware processor prevents HID operations from being received as input from the wireless peripheral device and from being transmitted to any wirelessly coupled information handling system. If the GATT network profiles do not match at the wireless peripheral device, the computer readable code instructions of the leash authorization agent installed on the wireless peripheral device prevents establishing Bluetooth® or BLE operable coupling with the intended device thereby limiting or leashing operations of the wireless peripheral device to those docking stations or hardware nodes authorized in the enterprise network in an embodiment. The computer readable code instructions of the leash authorization agent installed on the wireless peripheral device prevents connectivity to host hardware devices not having GATT network profiles for the enterprise network. Thus, although the wireless peripheral device may be paired with the docking station, the wireless peripheral device may not operate and be useless to provide input in those situations where the correct network (e.g., the correct GATT network profile) is not present.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions. According to embodiments herein, information handling system 100 may be operatively coupled to a docking station 156 that allows a wireless peripheral device 176 to be operatively coupled to the docking station 156 to provide input to the information handling system 100 and receive output from the information handling system 100. The docking station 156 and information handling system 100 may be used with the peripheral device 176 to facilitate the leashing of the wireless peripheral device 176 to a network associated with an enterprise such that the wireless peripheral device 176 only provides human interface device (HID) input to a node such as the information handling system 100 within that network.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a mouse 154, a trackpad 152, a stylus 150, a keyboard 148, a video/graphics display device 146, the docking station 156 and wireless peripheral device 176 described herein, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such a keyboard 148, a mouse 154, video display device 146, stylus 150, trackpad 152, the docking station 156 and the wireless peripheral device 176 described herein, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system

100 may also be operatively coupled to a wired or wireless input/output device 144 such as the wireless peripheral device 176 or other hardware devices via the docking station 156 that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface adapter 130 with its radio 132, RF front end 134 and antenna 136 is used to communicate with the wireless peripheral devices including, in some embodiments, the wireless peripheral device 176, via, for example, a Bluetooth® or Bluetooth® Low Energy (BLE) protocols. In other embodiments, Bluetooth®, BLE or other WPAN or WLAN may be used for communication with and among a wireless peripheral device, such as the wireless peripheral device 176 that may be leashed to the network of the enterprise that the information handling system 100 is operatively coupled to.

In other embodiments, a WAN, WWAN, LAN, and WLAN may each include an access point 140 or base station 142 used to operatively couple the information handling system 100 and docking station 156 to a network 138 via, for example, a wireless interface adapter 130. In a specific embodiment, the network 138 may include macro-cellular connections via one or more base stations 142 or a wireless access point 140 (e.g., Wi-Fi), or such as through licensed or unlicensed WWAN small cell base stations 142. Connectivity may be via wired or wireless connection. For example, wireless network wireless access points 140 or base stations 142 may be operatively connected to the docking station 156 and/or information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols. It is appreciated that, in an embodiment, the docking station 156 may also include a docking station wireless radio 166, docking station RF front end 168 and one or more docking station antennas 170-1, 170-2 that allow the docking station 156 to be wirelessly coupled to the network 138 and/or the wireless peripheral device 176. In an embodiment, the docking station 156 may be operatively coupled to the network 138 by virtue of the information handling system 100 being operatively coupled to the network 138 and the docking station 156 being operatively coupled, either wirelessly or wired connection, to the information handling system 100.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively coupled to the docking station 156 via either a wired or wireless connection. In an example embodiment, the wireless interface adapter 130 of the information handling system 100 and the docking station radio 166, docking station RF front end 168, and docking station antenna 170-1, 170-2 may be used to operatively and wirelessly couple the docking station 156 to the information handling system 100. In an embodiment, the information handling system 100 may be automatically wirelessly paired with the docking station 156 when the information handling system 100 is brought into wireless range with the docking station 156. During operation, because the docking station 156 has wireless capabilities, a number of peripheral devices may be wirelessly coupled to the docking station 156. These wireless peripheral devices may include a wireless video display device 146, a wireless keyboard 148, a wireless stylus 150, a wireless mouse 154, and the wireless peripheral device 176 described herein.

In an embodiment, the docking station 156 may be used to operatively leash a wireless peripheral device such as the wireless peripheral device 176 shown in FIG. 1 to an enterprise. For purposes of the present specification, the term "enterprise" is defined as a single business, company, or organization which manages and controls a wireless network 138 available to authorized users to gain access to hardware nodes within the network 138. As described herein, this network 138 may include any number and type of wireless network nodes such as the access points 140, base stations 142, a backend server 197, information handling system 100, docking stations 156, and the like which allows a user to access nodes on the network 138. By using the docking station 156 to leash the wireless peripheral device 176 as described herein, the wireless peripheral device 176 may only be used with those wireless nodes authorized within the network 138 of the enterprise. Because the wireless peripheral device 176 is effectively locked from operating when paired with any other device (e.g., another non-enterprise docking station or information handling system) identified as not being part of the network of the enterprise, theft of the wireless peripheral device 176 may be reduced or prevented. Still further, because the wireless peripheral device 176 may be wirelessly coupled to any node within the network of the enterprise, the wireless peripheral device 176 may be used by multiple users within the enterprise.

In an embodiment, the docking station 156 may include a docking station hardware processor 158 that executes computer-readable program code instructions used to perform the methods described herein. In an embodiment, the docking station hardware processor 158 may execute computer-readable program code of a docking station network characterization detection module 162 that detects characteristics of the network 138 of the enterprise and generates a docking station Bluetooth® (BT) generic attribute profile (GATT) network profile 164. In an embodiment, it is this docking station BT GATT network profile attributes 164 that is used as a leashing token to operatively leash the wireless peripheral device 176 to the network 138 of the enterprise in the systems and methods described herein. This docking station BT GATT network profile attributes 164 is stored on the docking station data storage device 160 along with the docking station network characterization detection module 162. In an embodiment, the docking station BT GATT network profile attributes 164 is referred to as a docking station BT GATT network profile attributes 164 because it is stored on the docking station data storage device 160 of the docking station 156 and may be the same BT GATT network profile attributes as copies of the BT GATT network profile attributes stored on a data storage device of the information handling system 100 and at a peripheral device storage device 180 that is non-volatile memory of the wireless peripheral device 176. Since the BT GATT network profile attributes stored on a peripheral device storage device 180 that is non-volatile memory of the wireless peripheral device 176, it is unchangeable except through re-provisioning by an ITDM of the enterprise.

In an embodiment, the docking station 156 further includes a docking station radio 166, docking station RF front end 168, and one or more docking station antennas 170-1, 170-2 and others (not shown) that are used to operatively couple the docking station 156 to the information handling system 100, the wireless peripheral device 176, and/or one or more nodes (e.g., access point 140, base station 142, and backend server 197) within the network 138 of the enterprise. It is appreciated that the docking station radio 166 may include multiple docking station antennas 170-1, 170-2 and others to wirelessly couple the docking station 156 to multiple wireless peripheral devices 176, the information handling system 100, and the network 138 including the backend server 197.

In an embodiment, the docking station 156 may also include a docking station PMU 172. The docking station PMU 172 may include a hardware controller and executable machine-readable code instructions to manage the power provided to the components of the docking station 156 such as the docking station hardware processor 158, the docking station data storage device 160, and the docking station radio 166 as well as other hardware components described herein. In an embodiment, the docking station PMU 172 may monitor power levels and be electrically coupled to the docking station 156 to provide this power. The docking station PMU 172 may regulate power from a power source such as the docking station A/C power adapter 174.

During operation, the docking station hardware processor 158 may execute computer-readable program code instructions of a docking station leash authorization module 163-A during a pairing process of the wireless peripheral device 176. Execution of the docking station leash authorization module 163-A causes the docking station 156 to request that the wireless peripheral device 176 provide its copy of the peripheral device Bluetooth GATT network profile 184 to confirm that the wireless peripheral device 176 is authorized to access the enterprise network. Additionally, the peripheral device Bluetooth GATT network profile 184 is used by the wireless peripheral device 176 to prevent the wireless peripheral device 176 from providing HID input to the enterprise network if the peripheral device Bluetooth GATT network profile 184 does not match the docking station BT GATT network profile attributes 164. This leashes the wireless peripheral device 176 to only nodes within the enterprise network or networks that have a matching GATT network profile (e.g., 164, 198).

It is appreciated that the wireless peripheral device 176 may be one of a plurality of wireless peripheral devices that may be operatively and wirelessly coupled to the docking station 156. In an embodiment, the wireless peripheral device 176 may include a peripheral device microcontroller 178 that executes computer-readable program code to perform the methods described herein. As described herein, the wireless peripheral device microcontroller 178 may also have access to computer-readable program code of a peripheral device network characterization detection module 182 that is executed by the peripheral device microcontroller 178 to receive a peripheral device BT GATT network profile attributes 184 and stores the peripheral device BT GATT network profile attributes 184 in non-volatile memory on a peripheral device storage device 180. In an embodiment, the peripheral device BT GATT network profile attributes 184 may match the docking station BT GATT network profile attributes 164 as described herein for the docking station hardware processor 158 to recognize and operatively couple the docking station 156 to the wireless peripheral device 176. If a match at the wireless peripheral device 176, computer-readable program code of a peripheral device network characterization detection module 182 and a peripheral device leash authorization module 163-B that is executed by the peripheral device microcontroller 178 allow the wireless peripheral device 176 to provide HID input to the docking station 156, information handling system 100, or other verified node on the enterprise network 138.

During operation, the wireless peripheral device 176 may be initialized by the user actuating a switch, a button, or other key that causes the peripheral device PMU 192 to provide power to the peripheral device microcontroller 178 and a wireless peripheral device radio 186. In an embodiment, the peripheral device microcontroller 178 may direct the wireless peripheral device radio 186 to broadcast a pairing request to a node on the enterprise network such as the docking station 156. When the docking station 156 receives this pairing request, both the docking station hardware processor 158 and peripheral device microcontroller

178 may execute the computer-readable program code of the leash authorization module 163. The execution of the docking station leash authorization module 163-A by the docking station hardware processor 158 allows the docking station 156 to determine if the wireless peripheral device 176 is allowed to be operatively coupled to the enterprise network by comparing the peripheral device Bluetooth GATT network profile 184 received by the docking station 156 to the docking station BT GATT network profile attributes 164. Additionally, the execution of the computer-readable program code instructions of the peripheral device leash authorization module 163-B by the peripheral device microcontroller 178 prevents or allows the wireless peripheral device 176 from accessing and providing HID input to the node (e.g., docking station 156) within the enterprise network unless the node has a matching BT GATT network profile attributes such as 164.

For example, where the peripheral device microcontroller 178 determines that the peripheral device Bluetooth GATT network profile 184 does not match the docking station BT GATT network profile attributes 164, execution of the peripheral device leash authorization module 163-B by the peripheral device microcontroller 178 prevents the wireless peripheral device 176 from providing HID input to the docking station node 156 because the docking station node 156 does not include a matching GATT network profile and therefore is not an authorized node within the enterprise network 138. A similar process would be conducted by execution of the peripheral device leash authorization module 163-B for any node the wireless peripheral device 176 attempts to wirelessly couple with. However, where the peripheral device Bluetooth GATT network profile 184 does match the docking station BT GATT network profile attributes 164, the execution of the peripheral device leash authorization module 163-B by the peripheral device microcontroller 178 indicates that the node is an authorized network node and that the wireless peripheral device 176 is allowed to provide HID input to the docking station 156 and be operatively coupled to the docking station 156 or other authorized node within the enterprise network.

Similar to the docking station 156, the wireless peripheral device 176 includes a peripheral device PMU 192. The peripheral device PMU 192 may include a hardware controller and executable machine-readable code instructions to manage the power provided to the components of the wireless peripheral device 176 such as the wireless peripheral device radio 186, the peripheral device storage device 180, and the peripheral device microcontroller 178 as well as other hardware components described herein. In an embodiment, the peripheral device PMU 192 may monitor power levels and be electrically coupled to the wireless peripheral device 176 to provide this power. The peripheral device PMU 192 may regulate power from a power source such as a wireless peripheral device battery 196.

In an embodiment, the wireless peripheral device 176 also includes a wireless peripheral device radio 186, wireless peripheral device RF front end 188, and wireless peripheral device antenna 190. The wireless peripheral device radio 186 may be used to operatively and wirelessly couple the wireless peripheral device 176 to the docking station 156 as described herein. In an embodiment, the wireless peripheral device 176 may be operatively coupled to the docking station 156 and may provide HID input to the information handling system 100 via the docking station 156 when the docking station hardware processor 158 has executed the computer-readable program code of the docking station leash authorization module 163-A in order to determine if the docking station BT GATT network profile attributes 164 matches the peripheral device BT GATT network profile attributes 184. Where a match is found between the docking station BT GATT network profile attributes 164 and the peripheral device BT GATT network profile attributes 184, the docking station leash authorization module 163-A at the docking station 156 confirms that the wireless peripheral device 176 is leashed to the enterprise and is allowed to provide HID input to the information handling system 100 within the network 138. Where the docking station network characterization detection module 162 or docking station leash authorization module 163-A finds that the peripheral device BT GATT network profile attributes 184 does not match the docking station BT GATT network profile attributes 164, although the wireless peripheral device 176 may be paired to the docking station 156, the docking station 156 prevents any HID input to the information handling system 100 or any other network node within the network 138 including access points 140, base stations 142, and the backend server 197 among other network node devices within the enterprise.

It is appreciated that a copy of the docking station BT GATT network profile attributes 164 may be transmitted to the peripheral device microcontroller 178 by the docking station hardware processor 158 and docking station radio 166 during an initial pairing process with the wireless peripheral device 176. In an embodiment, the copy of the docking station BT GATT network profile attributes 164 may be transmitted to the wireless peripheral device 176 using any secure and/or direct communication protocol, such as extended directed BLE GATT communication under a BLE protocol, with the wireless peripheral device 176 in order to prevent third-party information handling systems from being capable of receiving the copy of the docking station BT GATT network profile attributes 164. In an embodiment, the peripheral device microcontroller 178 may store this copy of the docking station BT GATT network profile attributes 164 on a non-volatile and persistent data storage device (e.g., peripheral device storage device 180) for access by the peripheral device microcontroller 178 during a subsequent pairing and operative coupling of the wireless peripheral device 176 to the docking station 156. In an embodiment, every time the wireless peripheral device 176 is being operatively coupled to the docking station 156 after the wireless peripheral device 176 has been turned off and then turned back on, for example, this authorization process is conducted with the comparison of the peripheral device Bluetooth GATT network profile 184 to the docking station BT GATT network profile attributes 164 by both the peripheral device microcontroller 178 and docking station hardware processor 158.

In an embodiment, the peripheral device BT GATT network profile attributes 184 may be provisioned on the peripheral device storage device 180 in non-volatile memory prior to the wireless peripheral device 176 being operatively coupled to the docking station 156. In an embodiment, after the docking station hardware processor 158 has executed the computer-readable program code of the docking station network characterization detection module 162 to detect the network characteristics, the docking station hardware processor 158 generates the docking station BT GATT network profile attributes 164. Once the docking station hardware processor 158 has generated the docking station BT GATT network profile attributes 164, the docking station BT GATT network profile attributes 164 may provide a copy of this docking station BT GATT network profile attributes 164 to the backend server 197. In an embodiment, the backend server 197 may be communicatively coupled to a hardware server of a manufacturer or an ITDM such that the backend server 197 sends a copy of the docking station BT GATT network profile attributes 164 to the manufacturer or ITDM in order to upload this copy onto a non-volatile memory of peripheral device storage device 180 after the user has purchased the wireless peripheral device 176. Peripheral device storage device 180 may be multiple storage memory devices and include some that are non-volatile memory in embodiments herein. By preinstalling the peripheral device BT GATT network profile attributes 184 (e.g., a copy of the docking station BT GATT network profile attributes 164) to the peripheral device storage device 180 in non-volatile memory, the user may have the manufactured or provisioned wireless peripheral device 176 shipped to the enterprise or user and be operatively coupled to the docking station 156 and leashed to the enterprise as described herein.

In an embodiment, the information handling system 100 may be used by the docking station 156 to detect the network characteristics and generate an information handling system BT GATT network profile attributes 198. This allows the docking station 156 to be operatively coupled to the information handling system 100 via a wired connection (e.g., USB-C or Thunderbolt wired connection) without the docking station 156 being wirelessly coupled to the network 138. In this example embodiment, the information handling system 100 may execute, via the hardware processor 102, computer-readable program code of an information handling system network characterization detection module 196 to detect the characteristics of the network 138 and generate an information handling system BT GATT network profile attributes 198. The hardware processor 102 may then transmit a copy of the information handling system BT GATT network profile attributes 198 to the docking station 156 for the docking station 156 to save the information handling system BT GATT network profile attributes 198 on the docking station data storage device 160 as a docking station BT GATT network profile attributes 164 as described herein. In this way, where the docking station 156 cannot be, even temporarily, coupled to the network 138, the docking station 156 may implement the information handling system 100 to detect those characteristics of the network 138 and generate a BT GATT network profile attributes for use in pairing and leashing the wireless peripheral device 176 to the docking station 156 and network 138.

In an embodiment, the detected network characteristics used by the docking station 156 to generate the docking station BT GATT network profile attributes 164 provide for a network signature of the enterprise network and may include any signature characteristics that specifically identify the network as the network of the enterprise to which the wireless peripheral device 176 is to be leashed to. In an embodiment, the detected network characteristics may include a domain name and network server gateway address associated with the enterprise network 138. A hardware identification of the docking station may be part of the identifiable network characteristics used to generate a BT GATT network profile attributes as described herein. In an embodiment, the network server gateway address may be specifically used to leash the wireless peripheral device 176 to the network 138 of the enterprise while the hardware identification of the docking station 156 such as a MAC address may be used to leash the wireless peripheral device 176 to a specific workspace operated by the docking station 156 within the enterprise. Thus, in an embodiment, the wireless peripheral device 176 may be operatively leashed to the network 138 of the enterprise and/or leashed to a specific workspace within that enterprise thereby further limiting the operability of the wireless peripheral device 176 with other nodes in the network 138, if necessary.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
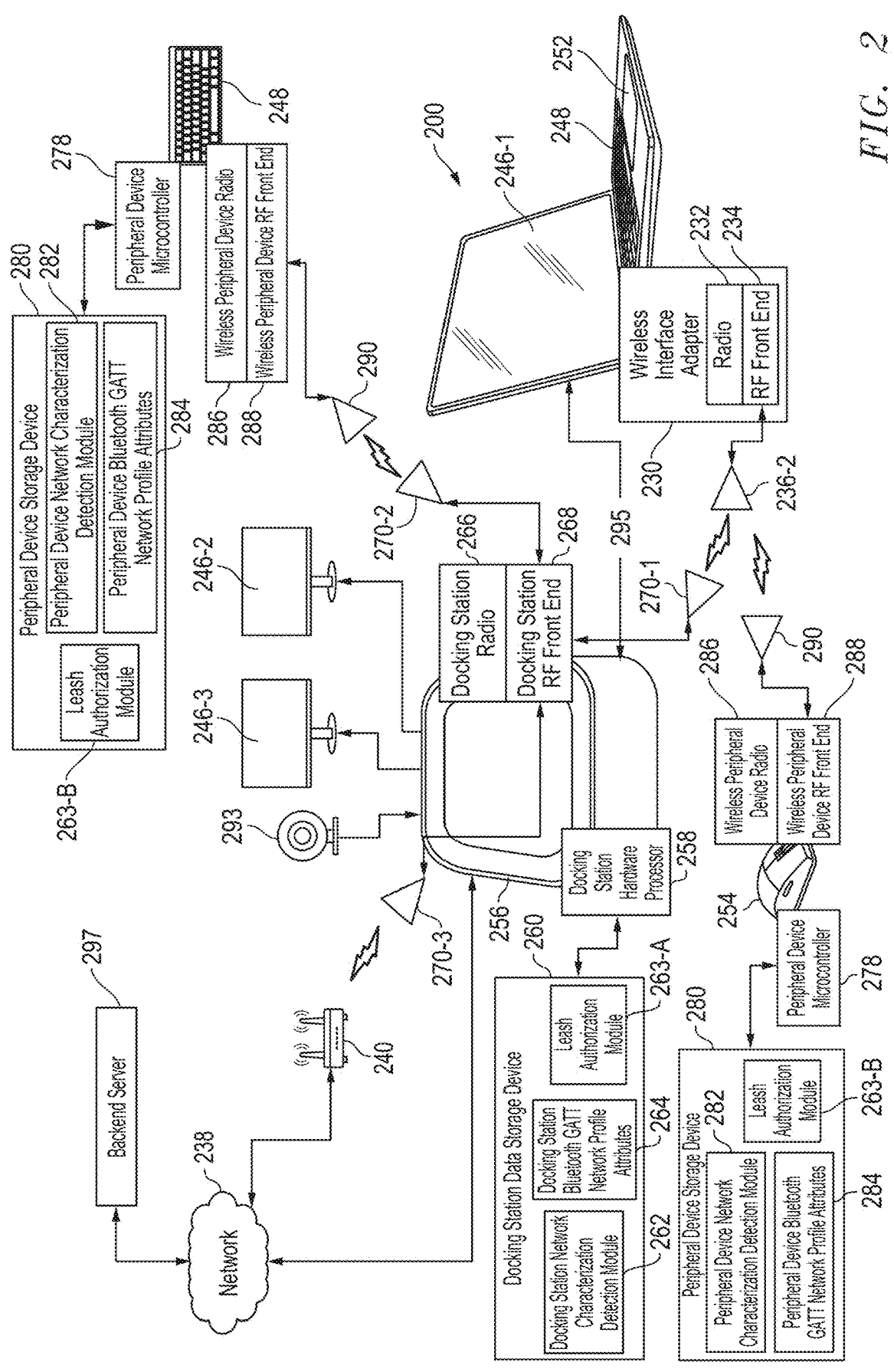
FIG. 2 is a graphic and block diagram illustrating an information handling system that may be operatively coupled to a docking station operably coupled to an enterprise network and a wireless peripheral device being only wirelessly couplable and leashed to devices operably coupled to that enterprise network according to another embodiment of the present disclosure.

FIG. 2 is a graphic and block diagram illustrating an information handling system 200 that may be operatively coupled to a docking station 256 and a wireless peripheral devices 248, 254, where wireless peripheral devices are leashed to an enterprise according to another embodiment of the present disclosure. FIG. 2 shows that the information handling system 200 is a laptop-type information handling system. It is appreciated that the information handling system 200 may be any type of information handling system. The information handling system 200 of FIG. 2 also shows a built-in keyboard 248 and trackpad 252 that allow the user to provide input to the managed host information handling system 200. Still further, the information handling system 200 of FIG. 2 shows a video display device 246-1 that may provide output to the user.

As described herein, the information handling system 200 may be operatively coupled to the docking station 256 via either a wired connection 295 or wireless connection. In an example embodiment, the wireless interface adapter 230 of the information handling system 200 and the docking station radio 266, docking station RF front end 268, and docking station antennas 270-1, 270-2 may be used to operatively and wirelessly couple the docking station 256 to the information handling system 200. In an embodiment, the information handling system 200 may be automatically wirelessly paired with the docking station 256 when the information handling system 200 is brought into wireless range with the docking station 256 due to previous pairing. During operation, because the docking station 256 has wireless capabilities, a number of peripheral devices may be wirelessly coupled to the docking station 256 including, in the example shown in FIG. 2, a wireless keyboard 248 and a wireless mouse 254 among other numbers and types of wireless peripheral devices. It is appreciated that other wireless peripheral devices may include a wireless video display device, a wireless stylus 250, and a wireless peripheral device similar to that described in FIG. 1 (e.g., 176). Wireless peripheral devices may alco be wirelessly coupled to the information handling system 200 in other embodiments.

FIG. 2 also shows a number of peripheral devices being operatively coupled to the docking station 256 via a number of wired connections. For example, the docking station 256 may operatively couple a second external monitor 246-2, a third external monitor 246-3, and a webcam 293 to allow for additional input and output capabilities of the workspace formed by the information handling system 200 and docking station 256.

As described herein, operation of the docking station 256 allows for the docking station 256 to be used to operatively leash a wireless peripheral device such as the wireless peripheral devices 248 and 254 shown in FIG. 2 to an enterprise. As described herein, a network 238 of the enterprise may include any number and type of wireless network nodes such as the access points (not shown), base stations (not shown), a backend server 297, and the like which allows a user to access the network 238. By using the docking station 256 and execution of a leash authorization module 263-B by a peripheral device microcontroller 278 to leash the wireless peripheral devices 248 and 254 as described herein, the wireless peripheral devices 248 and 254 may only be used with those wireless nodes within the network 238 of the enterprise. Because the wireless peripheral devices 248 and 254 is effectively locked from operating when paired with any other node device (e.g., a docking station or information handling system) identified as not being part of the network of the enterprise, theft of the wireless peripheral devices 248 and 254 may be reduced or prevented. Still further, because the wireless peripheral devices 248 and 254 may be wirelessly coupled to any node within the network of the enterprise, the wireless peripheral devices 248 and 254 may be used by multiple users within the enterprise.

In an embodiment, the docking station 256 may include a docking station hardware processor 258 that executes computer-readable program code instructions used to perform the methods described herein. In an embodiment, the docking station hardware processor 258 may execute computer-readable program code of a docking station network characterization detection module 262 that detects characteristics of the network 238 of the enterprise and generates a docking station BT GATT network profile attributes 264. In an embodiment, it is this docking station BT GATT network profile attributes 264 that is used as a leashing token to operatively leash the wireless peripheral devices 248 and 254 to the network 238 of the enterprise in the systems and methods described herein. This docking station BT GATT network profile attributes 264 is stored on the docking station data storage device 260 along with the docking station network characterization detection module 262. In an embodiment, the docking station data storage device 260 may be a non-volatile and secure such that once the docking station BT GATT network profile attributes 264 has been written to the docking station data storage device 260, it cannot be overwritten or otherwise alterable unless authorization via, for example, a password is provided. In an embodiment, the docking station BT GATT network profile attributes 264 is stored on the location on the docking station data storage device 260 that is accessible by the peripheral device microcontroller 278 used to identify the wireless peripheral device 248, 254 as being a wireless peripheral device 248, 254 that is leashed to the enterprise and can only provide HID output to an enterprise node on the network 238 such as the backend server 297.

In an embodiment, the docking station BT GATT network profile attributes 264 is referred to as a docking station BT GATT network profile attributes 264 because it is stored on the docking station data storage device 260 of the docking station 256 and may be the same BT GATT network profile attributes as copies or similar variations of the BT GATT network profile attributes stored on a data storage device of the information handling system 200 and on a peripheral device storage device 280 of the wireless peripheral devices 248 and 254.

In an embodiment, the docking station 256 further includes a docking station radio 266, docking station RF front end 268, and one or more docking station antennas 270-1, 270-2, and others, that are used to operatively and wirelessly couple the docking station 256 to the information handling system 200, one or more wireless peripheral devices 248, 254, and/or one or more nodes (e.g., access point, base station, and backend server 297) within the network 238 of the enterprise. It is appreciated that the docking station radio 266 may include multiple docking station antennas 270-1, 270-2, and others to wirelessly couple the docking station 256 to multiple wireless peripheral devices 276, the information handling system 200, and the network 238 including the backend server 297.

It is appreciated that the wireless peripheral devices 248, 254 may be any of a plurality of wireless peripheral devices that may be operatively and wirelessly coupled to the docking station 256 and be leashed according to embodiments of the present disclosure. In an embodiment, the wireless peripheral devices 248, 254, or other wireless peripheral devices, may include a peripheral device microcontroller 278 that executes computer-readable program code to perform the methods described herein. As described herein, the peripheral device microcontroller 278 may have access to computer-readable program code of a peripheral device network characterization detection module 282 that is executed by the peripheral device microcontroller 278 to receive a peripheral device BT GATT network profile attributes 284 and stores the peripheral device BT GATT network profile attributes 284 on a peripheral device storage device 280. In an embodiment, the peripheral device BT GATT network profile attributes 284 may match the docking station BT GATT network profile attributes 264 in later wireless couplings as described herein for the docking station hardware processor 258 executing the computer-readable program code of the leash authorization module 263-A to recognize and operatively couple the docking station 256 to the wireless peripheral devices 248 and 254 and allow the wireless peripheral devices 248 and 254 to provide HID input to the docking station 256 and information handling system 200.

During operation, the wireless peripheral devices 248, 254 may be initialized by the user actuating a switch, a button, or other key that causes the peripheral device PMU to provide power to the peripheral device microcontroller 278 and a wireless peripheral device radio 286. In an embodiment, the peripheral device microcontroller 278 may direct the wireless peripheral device radio 286 to broadcast a pairing request to a node on the enterprise network such as the docking station 256. When the docking station 256 receives this pairing request, both the docking station hardware processor 258 and peripheral device microcontrollers 278 may execute the computer-readable program code of the leash authorization module 263-A and 263-B respectively. The execution of the leash authorization module 263-A by the docking station hardware processor 258 allows the docking station 256 to determine if the wireless peripheral devices 248 and 254 is allowed to be operatively coupled to the enterprise network by comparing the peripheral device Bluetooth GATT network profile 284 received by the docking station 256 to the docking station BT GATT network profile attributes 264 for confirmation to proceed. Additionally, the execution of the computer-readable program code instructions of the leash authorization module 263-B by the peripheral device microcontroller 278 prevents or allows the wireless peripheral devices 248 and 254 from accessing and providing human interface device (HID) input to the node (e.g., docking station 256) within the enterprise network based on a match of the docking station BT GATT network profile attributes 264 to the peripheral device Bluetooth GATT network profile 284. For example, where the peripheral device microcontroller 278 determines that the peripheral device Bluetooth GATT network profile 284 does not match the docking station BT GATT network profile attributes 264, execution of the leash authorization module 263-B by the peripheral device microcontroller 278 prevents the wireless peripheral devices 248 and 254 from providing HID input to the node because the node does not including a matching GATT network profile and therefore is not an authorized node within the enterprise network. However, where the peripheral device Bluetooth GATT network profile 284 does match the docking station BT GATT network profile attributes 264, the execution of the leash authorization module 263 by the peripheral device microcontroller 278 indicates that the node is an authorized network node and that the wireless peripheral devices 248 and 254 is allowed to provide HID input to the docking station 256 and be operatively coupled to the docking station 256 or other authorized node within the enterprise network.

In an embodiment, the wireless peripheral devices 248, 254 also includes their own wireless peripheral device radio 286, wireless peripheral device RF front end 288, and wireless peripheral device antenna 290. Each of the wireless peripheral device radios 286 may be used to operatively and wirelessly couple the wireless peripheral devices 248, 254 to the docking station 256 as described herein. In an embodiment, the wireless peripheral devices 248, 254 may be operatively coupled to the docking station 256 and may provide HID input to the information handling system 200 via the docking station 256 when the docking station hardware processor 258 has executed the computer-readable program code of the leash authorization module 263 in order to determine if the docking station BT GATT network profile attributes 264 matches the peripheral device BT GATT network profile attribute sets 284 stored on a peripheral device storage device 280 of each of the wireless peripheral devices 248, 254. Where a match is found between the docking station BT GATT network profile attributes 264 and the peripheral device BT GATT network profile attribute sets 284, the leash authorization module 263 confirms that the wireless peripheral devices 248 and 254 is leashed to the enterprise and is allowed to provide HID input to the information handling system 200 within the network 238. Where the docking station network characterization detection module 262 finds that the peripheral device BT GATT network profile attribute sets 284 do not match the docking station BT GATT network profile attribute sets 264, although the wireless peripheral devices 248, 254 may be paired to the docking station 256, the docking station 256 prevents any HID input to information handling system 200 or any other network node within the network 238 including access points 240, base stations 242, and the backend server 297 among other network node devices within the enterprise.

It is appreciated that a copy of the docking station BT GATT network profile attributes 264 may be transmitted to the peripheral device microcontroller 278 by the docking station hardware processor 258 and docking station radio 266 during an initial pairing process with the wireless peripheral devices 248 and 254. In an embodiment, the copy of the docking station BT GATT network profile attributes 264 may be transmitted to the wireless peripheral devices 248 and 254 using any secure and/or direct communication protocol, such as an extended directed BLE GATT communication, with the wireless peripheral devices 248 and 254 in order to prevent third-party information handling systems from being capable of receiving the copy of the docking station BT GATT network profile attributes 264. In an embodiment, the peripheral device microcontroller 278 may store this copy of the docking station BT GATT network profile attributes 264 on a non-volatile and persistent data storage device (e.g., peripheral device storage device 280) for access by the peripheral device microcontroller 278 during a subsequent pairing and operative coupling of the wireless peripheral devices 248 and 254 to the docking station 256. In an embodiment, every time the wireless peripheral devices 248 and 254 is being operatively coupled to the docking station 256 after the wireless peripheral devices 248 and 254 has been turned off and then turned back on, for example, this leash authorization process is conducted with the comparison of the peripheral device Bluetooth GATT network profile 284 to the docking station BT GATT network profile attributes 264 by both the peripheral device microcontroller 278 and docking station hardware processor 258.

In an embodiment, the peripheral device BT GATT network profile attribute sets 284 may be provisioned on the peripheral device storage device 280 prior to the wireless peripheral devices 248 and 254 being operatively coupled to the docking station 256. In an embodiment, after the docking station hardware processor 258 has executed the computer-readable program code of the docking station network characterization detection module 262 to detect the network characteristics the docking station hardware processor 258 generates the docking station BT GATT network profile attributes 264. Once the docking station hardware processor 258 has generated the docking station BT GATT network profile attributes 264, the docking station BT GATT network profile attributes 264 may provide a copy of this docking station BT GATT network profile attributes 264 to the backend server 297. In an embodiment, the backend server 297 may be communicatively coupled to a hardware server (not shown) of a manufacturer such that the backend server 297 sends a copy of the docking station BT GATT network profile attributes 264 to the manufacturer in order to upload this copy onto a non-volatile peripheral device storage devices 280 after the user has purchased the wireless peripheral devices 248, 254. By preinstalling the peripheral device BT GATT network profile attributes 284 (e.g., a copy of the docking station BT GATT network profile attributes 264) to the peripheral device storage devices 280, the user may have the manufactured wireless peripheral devices 248, 254 shipped to the enterprise and be operatively coupled to the docking station 256 and leashed to the enterprise as described herein.

In an embodiment, the information handling system 200 may be used by the docking station 256 to detect the network characteristics and generate an information handling system BT GATT network profile attributes 298. In an embodiment, the docking station 256 may require the use of the information handling system 200 because the docking station 256 is not operatively coupled to the network 238 either via a wired or wireless connection but the information handling system 200 is operatively coupled to the network 238. This allows the docking station 256 to be operatively coupled to the information handling system 200 via a wired connection (e.g., USB-C or Thunderbolt wired connection) and rely on the processing resources and communication resources at the information handling system 200 to perform the methods described herein. In this example embodiment, the information handling system 200 may execute, via the hardware processor 202, computer-readable program code of an information handling system network characterization detection module 296 to detect the characteristics of the enterprise network 238 upon authorized coupling to the enterprise network 238 and generate an information handling system BT GATT network profile attributes 298 based upon that authorized coupling. The hardware processor 202 may then transmit a copy of the information handling system BT GATT network profile attributes 298 to the docking station 256 for the docking station 256 to save the information handling system BT GATT network profile attributes 298 on the docking station data storage device 260 as a docking station BT GATT network profile attributes 264 as described herein. In this way, where the docking station 256 cannot be, even temporarily, coupled to the network 238, the docking station 256 may implement the information handling system 200 to detect those characteristics of the network 238 and generate a BT GATT network profile attributes for use in pairing and leashing the wireless peripheral devices 248 and 254 to the docking station 256 and network 238. In an embodiment, the information handling system 200 may also provide the BT GATT network profile attributes to the backend server 297 for copying and uploading to the wireless peripheral devices 248, 254 prior to being initiated at the docking station 256. It is appreciated that the backend server 297, in an embodiment, may receive and maintain any number of BT GATT network profile attribute sets from any number of enterprises such that when an internet technology decision maker (ITDM) orders a wireless peripheral device 248, 254, the appropriate BT GATT network profile attribute sets may be automatically uploaded to the peripheral device storage devices for pairing and leashing of the wireless peripheral devices 248, 254 to the enterprise's network 238 when the wireless peripheral devices 248, 254 are initiated and begin a pairing process with the docking station 256.

In an embodiment, the detected network characteristics used by the docking station 256 to generate the docking station BT GATT network profile attributes 264 detected by any of the network characterization detection modules may be any characteristics and attributes that specifically identify the network as the network of the enterprise to which the wireless peripheral devices 248 and 254 is to be leashed. By enabling confirmation of enterprise network connectivity of a network node, such as a docking station 256, from a combination of enterprise network attributes aggregated in the BT GATT network profile attributes 264 with a peripheral device BT GATT network profile attributes 284, this enables the leash function to permit pairing or wireless coupling in embodiments herein. Without a match or confirmation of BT GATT network profile attributes to confirm enterprise network connectivity, no operative coupling and transfer of HID data from the wireless peripheral devices 248 or 254 will be permitted by the leash authorization modules 263-A or 263-B respectively in embodiments herein. In an embodiment, the detected network characteristics or aggregated attributes may include a domain name and network server gateway address associated with the network 238. The network characteristics aggregated attributes may involve a string of values drawn from enterprise network aspects such as a gateway address of a network server (such as the backend server), identifying a domain controller of the enterprise network, a Group Policy Object filter that has been set up and detected, a Security Mode of the enterprise network, or an organizationally unique identifier (OUI) for the enterprise or vendors of server nodes in the enterprise network 238. A hardware identification of the docking station may be part of the identifiable network characteristics used to generate a BT GATT network profile attributes as described herein. Hardware identification or ownership identification of the wireless peripheral device may relate also the identifiable network characteristics used in a BT GATT network profile attributes that may be stored on the wireless peripheral device in embodiments herein. In an embodiment, the gateway address to the enterprise network 238 may be specifically used to leash the wireless peripheral devices 248 and 254 to the network 238 of the enterprise while the hardware identification of the docking station 256 may be used to leash the wireless peripheral devices 248 and 254 to a specific workspace operated by the docking station 256 within the enterprise. Thus, in an embodiment, the wireless peripheral devices 248 and 254 may be operatively leashed to the network 238 of the enterprise. In a further embodiment, the wireless peripheral devices 248 and 254 may be operatively leashed to a specific workspace within that enterprise thereby further limiting the operability of the wireless peripheral devices 248 and 254 from use with other nodes in the network 238 if necessary.

Figure 3:
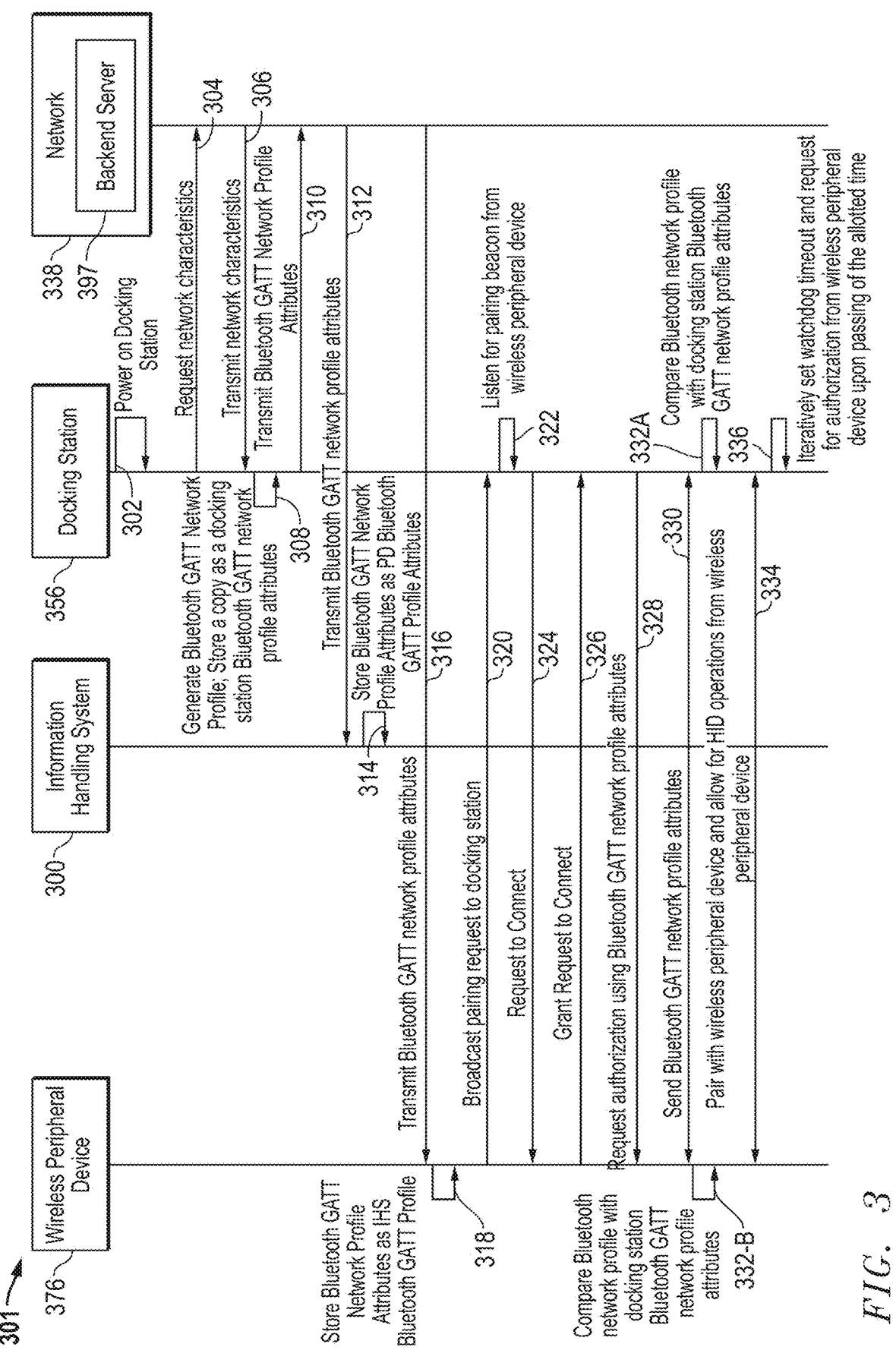
FIG. 3 is a swimlane flowchart showing a method of leashing and verifying leashed authentication and pairing of a wireless peripheral device to a docking station operably coupled to an enterprise network according to an embodiment of the present disclosure.

FIG. 3 is a swimlane flowchart showing a method 301 of pairing a wireless peripheral device 376 to a docking station 356 and leashing that wireless peripheral device 376 to a network 338 of an enterprise according to an embodiment of the present disclosure. In an embodiment, FIG. 3 shows that the network includes a backend server 397 that forms part of the network of the enterprise. It is appreciated, however, that the network 338 may include additional nodes such as access points, base stations, other backend servers, and other hardware devices that form a network.

As described herein, execution of a docking station network characterization detection module by the docking station hardware processor allows the docking station to determine whether a wireless peripheral device should be leashed to the network 338. The method 301 may include the docking station 356 being initiated at line 302. The docking station 356, in an embodiment, may be initiated by a user by actuation a button, switch, or key on the docking station 356 that causes power to be provide to the docking station hardware processor and docking station data storage device as well as other hardware devices of the docking station 356 such as a docking station radio.

By providing power to the docking station hardware processor, the docking station hardware processor may execute computer-readable program code of a docking station network characterization detection module to, at line 304, request network characteristics from the backend server 397 of the enterprise network 338. In an embodiment, the communications between the docking station 356 and the backend server 397, when it is a wireless communication, may be completed using a GATT communication protocol to transmit data requests and data to and from the docking station 356. In an embodiment, the detected network characteristics may include a domain name and network server gateway address associated with the network 338. A hardware identification of the docking station may be part of the identifiable network characteristics used to generate a BT GATT network profile attributes as described herein. In an embodiment, the gateway address may be specifically used to leash the wireless peripheral device 376 to the network 338 of the enterprise while the hardware identification of the docking station 356 may be used to further leash the wireless peripheral device 376 to a specific workspace operated by the docking station 356 within the enterprise network 338. At line 306, the backend server 397 may transmit the requested network characteristics to the docking station 356 in response to the request at line 304.

The method 301, at line 308, includes the docking station hardware processor executing the computer-readable program code instructions of the docking station network characterization detection module to generate a BT GATT network profile attributes. In an embodiment, the docking station hardware processor may generate the BT GATT network profile attributes by forming a string bytes that include data describing, at least, the gateway address of the network server (e.g., backend server 397). The string of bytes may also include hardware identifiers such as an identification of the docking station. In an embodiment, the docking station hardware processor may execute any hash algorithm or other cryptographic algorithm to create a unique and secure BT GATT network profile attributes set that may be used in the method 301 described herein to determine whether the wireless peripheral device 376 should be allowed to provide HID input to a node device on the network 338 such as the information handling system 300.

The method 301 further includes the docking station 356 transmitting the generated BT GATT network profile attributes to the backend server 397 at line 310. As described herein, the backend server 397 may be communicatively coupled to a hardware server (not shown) of a manufacturer or an ITDM provisioning server such that the backend server 397 sends a copy of the docking station BT GATT network profile attributes to the manufacturer or ITDM in order to upload this copy onto a non-volatile peripheral device storage device after the user has purchased the wireless peripheral devices or when they are provisioned by the ITDM. By preinstalling the peripheral device BT GATT network profile attributes (e.g., a copy of the docking station BT GATT network profile attributes described herein) to the peripheral device storage devices, the user may have the manufactured wireless peripheral devices shipped to the enterprise or the ITDM and be operatively coupled to the docking station 356 and leashed to the enterprise as described herein. In an embodiment, this provisioning of the BT GATT network profile attributes to the wireless peripheral device 376 is shown at line 316 with the wireless peripheral device 376 storing the BT GATT network profile attributes to a data storage on the wireless peripheral device 376 at line 318.

In an embodiment, the backend server 397 may also send a copy of the BT GATT network profile attributes to the information handling system 300 at line 312. Provisioning of the BT GATT network profile attributes may allow the information handling system 300 to operate on behalf of the docking station 356 when, for example, the docking station 356 is not operatively coupled to the backend server 397 of the enterprise network when the wireless peripheral device 376 is initiated and the pairing process is started. At line 314, the BT GATT network profile attributes may be stored on a non-volatile and secure data storage device on the information handling system 300 for later use if necessary. Additionally, the BT GATT network profile attributes stored at the information handling system 300 may be used by the docking station 356 to subject the information handling system 300 to a similar pairing process that allows the information handling system 300 to be operatively coupled to the enterprise network 338 or prevents such an operative coupling to leash the information handling system 300. Thus, in an embodiment, the information handling system 300 itself may be treated or not as a leashed device to the enterprise network 338 based on the provisioning of the correct BT GATT network profile attributes stored thereon and operation of policies with the leash authorization module that may operate on the information handling system 300.

At line 320, the wireless peripheral device 376 may be initiated and begin broadcasting a request to pair with the docking station 320. The initiation of the wireless peripheral device 376 may cause the wireless peripheral device PMU to provide power to the wireless peripheral device microcontroller to control the wireless peripheral device radio to broadcast this pairing request. In an embodiment, a peripheral device microcontroller at the wireless peripheral device 376 may execute code instructions of a docking station leash authorization module to monitor and determine if the wireless peripheral device 376 will be operational to pair or after pairing.

At line 322, the docking station 356 may listen for the pairing beacon and request from the wireless peripheral device 376 to pair with the docking station. In an embodiment, the docking station 356 may continuously scan for such pairing requests. In another embodiment, a user may actuate a button, switch, or other key on the docking station 356 to cause the docking station 356 to begin to scan for the pairing beacon from the wireless peripheral device 376. In yet another embodiment, a software trigger may be executed by the hardware processor of the backend server 397 that causes the docking station 356 to be put into a pairing mode. This software trigger may be triggered when, for example, an ITDM accesses the backend server 397 and triggers the event.

When the docking station 356 detects the pairing request from the wireless peripheral device 376, the docking station 356 may initiate the pairing process by requesting to connection with the wireless peripheral device 376 at line 324. At line 326 the wireless peripheral device 376 grants that request. Again, in an embodiment, the docking station 356 may communicate, at least initially for a pairing request and grant, with the wireless peripheral device 376 using the GATT communication protocols as described herein.

In order to determine whether the wireless peripheral device 376 is allowed to provide HID input to the nodes of the network 338 such as the backend server 397, the docking station 356 may compare a unique BT GATT network profile attributes signature value stored on the docking station data storage device to a unique BT GATT network profile attributes signature value requested by the docking station 356 at line 328. This BT GATT network profile attributes signature value may be referred to simply as a BT GATT network profile attributes in embodiments herein that may be a hashed or encrypted value for secure exchange and comparison in embodiments herein. In response to the request for the BT GATT network profile attributes from the wireless peripheral device 376, the wireless peripheral device 376 responds with their copy of the BT GATT network profile attributes. In an embodiment, at line 332-A, the docking station hardware processor may execute the computer-readable program code instructions of the docking station network characterization detection module and the leash authorization module to compare the BT GATT network profile attributes stored on the docking station data storage device to the BT GATT network profile attributes provided wirelessly from the wireless peripheral device 376. It is also appreciated that while the docking station 356 is making this comparison, at line 332-B the peripheral device microcontroller may also execute computer-readable program code instructions of a leash authorization module to compare the docking station BT GATT network profile attributes to the peripheral device Bluetooth GATT network profile in order to determine whether the enterprise network is a network to which the wireless peripheral device 376 may not only be paired to but also be operatively coupled to the enterprise network and provide HID input to the node such as the docking station 356 of the enterprise network. In an embodiment, both the docking station 356 and wireless peripheral device 376 may transmit, securely, such as in an extended directed BLE GATT communication, their GATT network profiles, that may be hashed or encrypted, to each other for each device to complete this comparison process. In an alternative embodiment, the docking station hardware processor may complete this comparison process and notify, wirelessly, the wireless peripheral device of the comparison outcome.

In an embodiment, the copy of the docking station BT GATT network profile attributes may have been transmitted to the wireless peripheral device 376 by the docking station 356 during an initial and first pairing process using any secure and/or direct communication protocol with the wireless peripheral device 376 in order to prevent third-party information handling systems from being capable of receiving the copy of the docking station BT GATT network profile attributes. In an embodiment, the peripheral device microcontroller may store this copy of the docking station BT GATT network profile attributes on a non-volatile and persistent data storage device (e.g., peripheral device storage device) for access by the peripheral device microcontroller during a subsequent pairing and operative coupling of the wireless peripheral device 376 to the docking station 356. In an embodiment, every time the wireless peripheral device 376 is being operatively coupled to the docking station 356 after the wireless peripheral device 376 has been turned off and then turned back on, for example, this authorization process is conducted with the comparison of the peripheral device Bluetooth GATT network profile to the docking station BT GATT network profile attributes by both the peripheral device microcontroller and docking station hardware processor.

Where the BT GATT network profile attribute sets at the wireless peripheral device 376 and docking station 356 do not match at lines 332-A or 332-B, the wireless peripheral device 376 is prevented from sending HID input to any node within the enterprise network 338 such as the docking station 356, the information handling system 300, the backend server 397, access points, base stations, and any other hardware node. However, where the BT GATT network profile attributes of the wireless peripheral device 376 matches the BT GATT network profile attributes at the docking station 356 at line 332-A or 332-B 332, the wireless peripheral device 376 is authorized to provide HID input to these nodes within the enterprise network 338 and the docking station 356 is paired with the wireless peripheral device 376 at line 334. It is appreciated that because the BT GATT network profile attributes is unique to the docking station 356 and the enterprise network 338, the inclusion of a matching BT GATT network profile attributes at the wireless peripheral device 376 indicates to the docking station 356 that the wireless peripheral device 376 is trustworthy and is to be leashed to the enterprise network 338.

It is appreciated that the wireless peripheral device microcontroller may determine that because the BT GATT network profile attribute sets do not match, the wireless peripheral device is not leashed to the enterprise network node to which the wireless peripheral device 376 is attempting to be operatively coupled and, therefore, should not provide HID input to the node such as the docking station 356. The methods and systems described herein, therefore, prevents the use of a wireless peripheral device 376 at an enterprise network to which it is not leashed to as identified by an incorrectly matching BT GATT network profile attributes or the non-existence of a BT GATT network profile attributes at a node. Indeed, because the wireless peripheral device 376 is effectively locked from operating when paired with any other device (e.g., a docking station or information handling system) identified as not being part of the network of the enterprise, theft of the wireless peripheral device 376 may be reduced or prevented because the wireless peripheral device 376 cannot be used within any other enterprise network and provide HID input. Also, because the wireless peripheral device 376 may be wirelessly coupled to any node within the network of the enterprise having a matching BT GATT network profile attributes, the wireless peripheral device 376 may be used by multiple users within the enterprise thereby allowing multiple users to physically move the wireless peripheral device 376 with the enterprise and be operatively coupled to only any enterprise network nodes.

In an embodiment, the method 301 may also include, at line 336, the docking station 356 iteratively setting a watchdog timeout. In an embodiment, this watchdog timeout sets a timer such that after an allotted or predetermined amount of time, the docking station 356 initiates a request for reauthorization by the wireless peripheral device 376 to the docking station 356 using the BT GATT network profile attributes. Again, this process at line 336 may include similar processes associated with lines 328 through 332. Where, for example, this reauthorization indicates that the wireless peripheral device 376 does not include the BT GATT network profile attributes that matches that BT GATT network profile attributes stored on the docking station data storage device for some reason, the docking station 356 may reject HID input from the, now paired, wireless peripheral device 376 in an embodiment. This may prevent repairing and usage with a previously paired information handling system that is no longer enterprise network associated or authorized after a watchdog timeout period.

Figure 4:
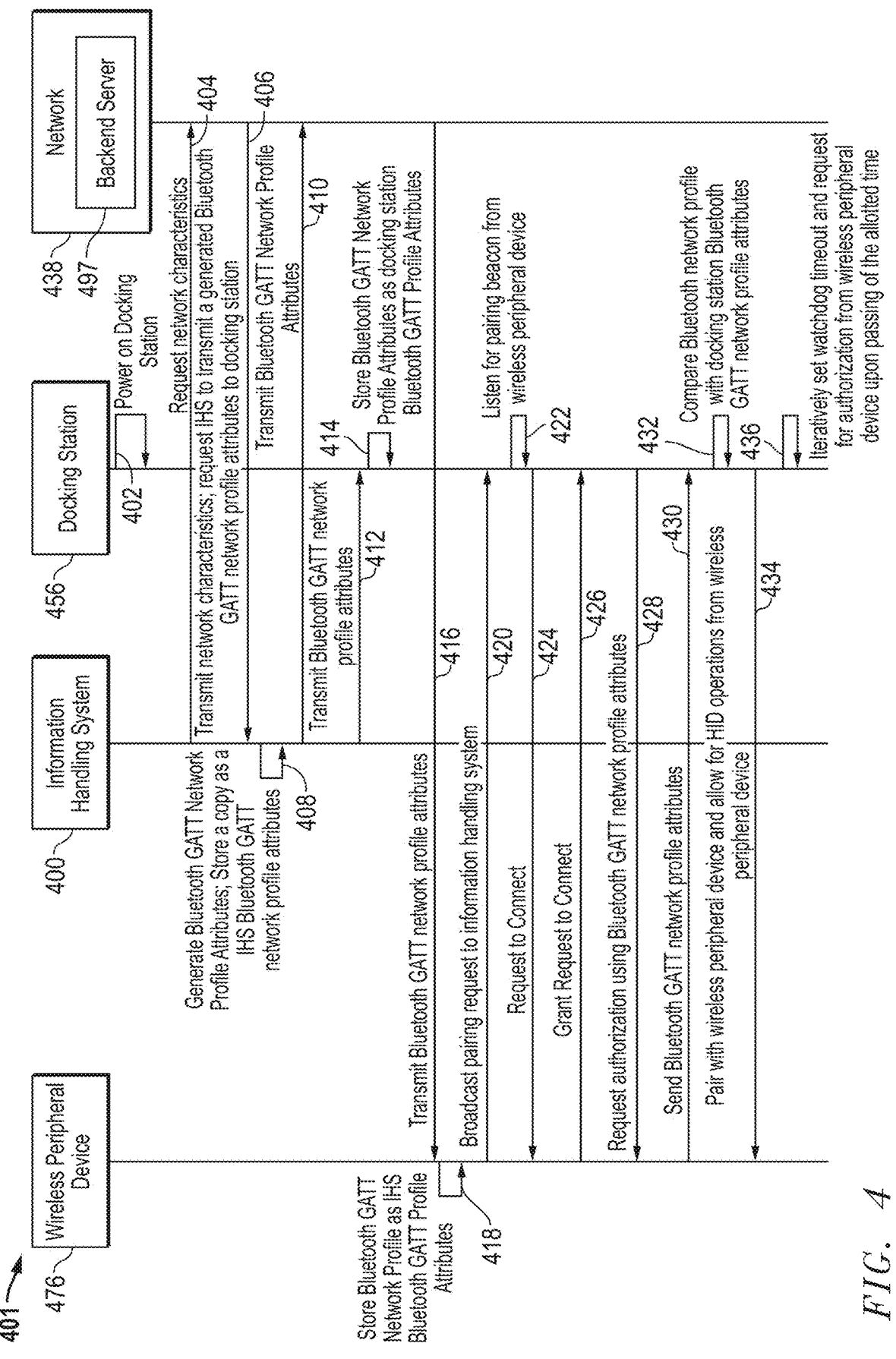
FIG. 4 is a swimlane flowchart showing a method of leashing and verifying leashed authentication and pairing of a wireless peripheral device to a docking station operably coupled to an enterprise network according to another embodiment of the present disclosure.

FIG. 4 is a swimlane flowchart showing a method 401 of pairing a wireless peripheral device 476 to a docking station 456 and leashing that wireless peripheral device 476 to a network 438 of an enterprise according to another embodiment of the present disclosure. In an embodiment, FIG. 4 shows that the network 438 includes a backend server 497 that forms part of the network of the enterprise. It is appreciated, however, that the network 438 may include additional nodes such as access points, base stations, other backend servers, and other hardware devices that form a network and may include the information handling system 400 and docking station 456 as nodes within that enterprise network 438.

FIG. 4 describes a method 401 to leash the wireless peripheral device 476 to the enterprise network 438 where the docking station 456 is not operatively coupled to the enterprise network 438 but that the information handling system 400 is operatively coupled to the enterprise network 438. In this embodiment, the docking station 456 may be operatively coupled to the information handling system 400 via a wired or wireless connection thereby allowing the information handling system 400, instead of the docking station 456, to perform some of the processes described herein.

At line 402, the method 401 may include the docking station 456 being initiated. In an embodiment, initiation of the docking station 456 may include a user actuating a button, switch, or key on the docking station 456 that causes power to be provide to the docking station hardware processor and docking station data storage device as well as other hardware devices of the docking station 456 such as a docking station radio. By providing power to the docking station hardware processor, the docking station hardware processor may determine that the docking station 456 is operatively coupled to the information handling system 400 but not operatively coupled to the enterprise network 438. This may cause the docking station 456 to request that the information handling system 400 handle the generation of a BT GATT network profile attributes as described herein.

In order to generate the BT GATT network profile attributes, the hardware processor of the information handling system 400 may execute computer-readable program code instructions of an information handling system network characterization detection module. Execution of the information handling system network characterization detection module by the hardware processor of the information handling system 400 causes the information handling system 400, at line 404 to request network characteristics from the backend server 497 of the enterprise network 438. In an embodiment, the communications between the information handling system 400 and the backend server 497, when it is a wireless communication, may be completed using a GATT communication protocol to transmit data requests and data to and from the information handling system 400. In an embodiment, the detected network characteristics may include a domain name and network server gateway address associated with the network 438. A hardware identification of the docking station 456 to which the information handling system 400 is operatively coupled or to the information handling system 400 to may be part of the identifiable network characteristics used to generate a BT GATT network profile attributes as described herein. In an embodiment, the gateway address may be specifically used to leash the wireless peripheral device 476 to the network 438 of the enterprise while the hardware identification of the docking station 456 may be used to leash the wireless peripheral device 476 to a specific workspace operated by the docking station 456 within the enterprise network 438.

At line 406, the backend server 47 may transmit the requested network characteristics to the information handling system 400 in response to the request at line 404 as well as request the information handling system 400 to transmit any generated BT GATT network profile attribute sets to the docking station 456 when available.

The method 401, at line 408, includes the hardware processor of the information handling system 400 executing the computer-readable program code instructions of the information handling system network characterization detection module to generate a BT GATT network profile attributes. In an embodiment, the hardware processor of the information handling system 400 may generate the BT GATT network profile attributes by forming a string bytes that include data describing, at least, the gateway address of the network server (e.g., backend server 497). The string of bytes may also include hardware identifiers such as an identification of the docking station. In an embodiment, the hardware processor of the information handling system 400 may execute any hash algorithm or other cryptographic algorithm to create the unique BT GATT network profile attributes from this string or string of bytes of the network characteristics data and hardware identifiers. This unique BT GATT network profile attributes may be used in the method 401 described herein to determine whether the wireless peripheral device 476 should be allowed to provide HID input to a node device on the network 438 such as the information handling system 400 or docking station 456.

The method 401 further includes the information handling system 400 transmitting the generated BT GATT network profile attributes to the backend server 497 at line 410 and to the docking station 456 at line 412. As described herein, the backend server 497 may be communicatively coupled to a hardware server (not shown) of a manufacturer or an ITDM such that the backend server 497 sends a copy of the docking station BT GATT network profile attributes to the manufacturer or to an ITDM in order to upload this copy onto a non-volatile peripheral device storage device after the user has purchased the wireless peripheral device 476. By preinstalling the peripheral device BT GATT network profile attributes (e.g., a copy of the docking station BT GATT network profile attributes described herein) to the peripheral device storage devices, the wireless peripheral device 476 is delivered to the user and may be operatively paired and coupled to the docking station 456 and leashed to the enterprise as described herein. In an embodiment, this provisioning of the BT GATT network profile attributes to the wireless peripheral device 476 is shown at line 416 with the wireless peripheral device 476 storing the BT GATT network profile attributes to a data storage on the wireless peripheral device 476 at line 418.

In an embodiment, the docking station 456 may also store a copy of the BT GATT network profile attributes to a data storage device of the docking station 456 at line 414. The BT GATT network profile attributes may also be stored on a non-volatile and secure data storage device on the information handling system 400 for later use if necessary.

At line 420, the wireless peripheral device 476 may be initiated and begin broadcasting a request to pair with the docking station 420. The initiation of the wireless peripheral device 476 may cause the wireless peripheral device PMU to provide power to the wireless peripheral device microcontroller to control the wireless peripheral device radio to broadcast this pairing request.

At line 422, the docking station 456 may listen for the pairing beacon and request from the wireless peripheral device 476. In an embodiment, the docking station 456 may continuously scan for such pairing requests. In another embodiment, a user may actuate a button, switch, or other key on the docking station 456 to cause the docking station 456 to begin to scan for the pairing beacon from the wireless peripheral device 476. In yet another embodiment, a software trigger may be executed by the hardware processor of the backend server 497 that causes the docking station 456 to be put into a pairing mode. This software trigger may be triggered when, for example, an ITDM accesses the backend server 497 and triggers the event.

When the docking station 456 detects the pairing request from the wireless peripheral device 476, the docking station 456 may initiate the pairing process by requesting to connection with the wireless peripheral device 476 at line 424.

At line 426 the wireless peripheral device 476 grants that request. Again, in an embodiment, the docking station 456 may communicate, at least initially, with the wireless peripheral device 476 using the GATT communication protocols as described herein.

In order to determine whether the wireless peripheral device 476 is allowed to provide HID input to the nodes of the network 438 such as the backend server 497, the docking station 456 may compare a BT GATT network profile attributes stored on the docking station data storage device to a BT GATT network profile attributes requested by the docking station 456 at line 428. In response to the request for the BT GATT network profile attributes from the wireless peripheral device 476, the wireless peripheral device 476 responds with their copy of the BT GATT network profile attributes. In an embodiment, at line 432, the docking station hardware processor may execute the computer-readable program code instructions of the docking station network characterization detection module and leash authorization module to compare the BT GATT network profile attributes stored on the docking station data storage device to the BT GATT network profile attributes provided wirelessly from the wireless peripheral device 476. Again, it is also appreciated that while the docking station 456 is making this comparison, the peripheral device microcontroller may also execute computer-readable program code instructions of a leash authorization module to compare the docking station BT GATT network profile attributes to the peripheral device Bluetooth GATT network profile in order to determine whether the enterprise network is a network to which the wireless peripheral device 476 may not only be paired to but also be operatively coupled to the enterprise network and provide HID input to the node such as the docking station 456 of the enterprise network. In an embodiment, both the docking station 456 and wireless peripheral device 476 may transmit, securely, their GATT network profiles to each other for each device to complete this comparison process. In an alternative embodiment, the docking station hardware processor may complete this comparison process and notify, wirelessly, the wireless peripheral device of the comparison outcome.

In an embodiment, the copy of the docking station BT GATT network profile attributes may have been transmitted to the wireless peripheral device 476 by the docking station 456 during an initial and first pairing process using any secure and/or direct communication protocol with the wireless peripheral device 476 in order to prevent third-party information handling systems from being capable of receiving the copy of the docking station BT GATT network profile attributes. In an embodiment, the peripheral device microcontroller may store this copy of the docking station BT GATT network profile attributes on a non-volatile and persistent data storage device (e.g., peripheral device storage device) for access by the peripheral device microcontroller during a subsequent pairing and operative coupling of the wireless peripheral device 476 to the docking station 456. In an embodiment, every time the wireless peripheral device 476 is being operatively coupled to the docking station 456 after the wireless peripheral device 476 has been turned off and then turned back on, for example, this authorization process is conducted with the comparison of the peripheral device Bluetooth GATT network profile to the docking station BT GATT network profile attributes by both the peripheral device microcontroller and docking station hardware processor.

Where the BT GATT network profile attribute sets at the wireless peripheral device 476 and docking station 456 do not match at line 432, the wireless peripheral device 476 is prevented from sending HID input to any node within the enterprise network 438 such as the docking station 456, the information handling system 400, the backend server 497, access points, base stations, and any other hardware node. However, where the BT GATT network profile attributes of the wireless peripheral device 476 matches the BT GATT network profile attributes at the docking station 456 at line 432, the wireless peripheral device 476 is authorized to provide HID input to these nodes within the enterprise network 438 and the docking station 456 is paired with the wireless peripheral device 476 at line 434. It is appreciated that because the BT GATT network profile attributes is unique to the docking station 456 and the enterprise network 438, the inclusion of a matching BT GATT network profile attributes at the wireless peripheral device 476 indicates to the docking station 456 that the wireless peripheral device 476 is trustworthy and is to be leashed to the enterprise network 438.

Again, it is appreciated that the wireless peripheral device 476 microcontroller may determine that because the GATT network profiles do not match, the wireless peripheral device is not leashed to the enterprise network node to which the wireless peripheral device 476 is attempting to be operatively coupled and, therefore, should not provide HID input to the node such as the docking station 456. The methods and systems described herein, therefore, prevents the use of a wireless peripheral device 476 at an enterprise network to which it is not leashed to as identified by an incorrectly matching GATT network profile or the non-existence of a GATT network profile at a node. Indeed, because the wireless peripheral device 476 is effectively locked from operating when paired with any other device (e.g., a docking station or information handling system) identified as not being part of the network of the enterprise, theft of the wireless peripheral device 476 may be reduced or prevented because the wireless peripheral device 476 cannot be used within any other enterprise network and provide HID input. It is also true that, because the wireless peripheral device 476 may be wirelessly coupled to any node within the network of the enterprise, the wireless peripheral device 476 may be used by multiple users within the enterprise thereby allowing multiple users to physically move the wireless peripheral device 476 with the enterprise and be operatively coupled to any enterprise network nodes only.

In an embodiment, the method 401 may also include, at line 436, the docking station 456 iteratively setting a watchdog timeout. In an embodiment, this watchdog timeout sets a timer such that after an allotted or predetermined amount of time, the docking station 456 initiates a request for reauthorization by the wireless peripheral device 476 to the docking station 456 using the BT GATT network profile attributes. Again, this process at line 436 may include similar processes associated with lines 428 through 432. Where, for example, this reauthorization indicates that the wireless peripheral device 476 does not include the BT GATT network profile attributes that matches that BT GATT network profile attributes stored on the docking station data storage device, the docking station 456 may reject HID input from the, now paired, wireless peripheral device 476.

Figure 5:
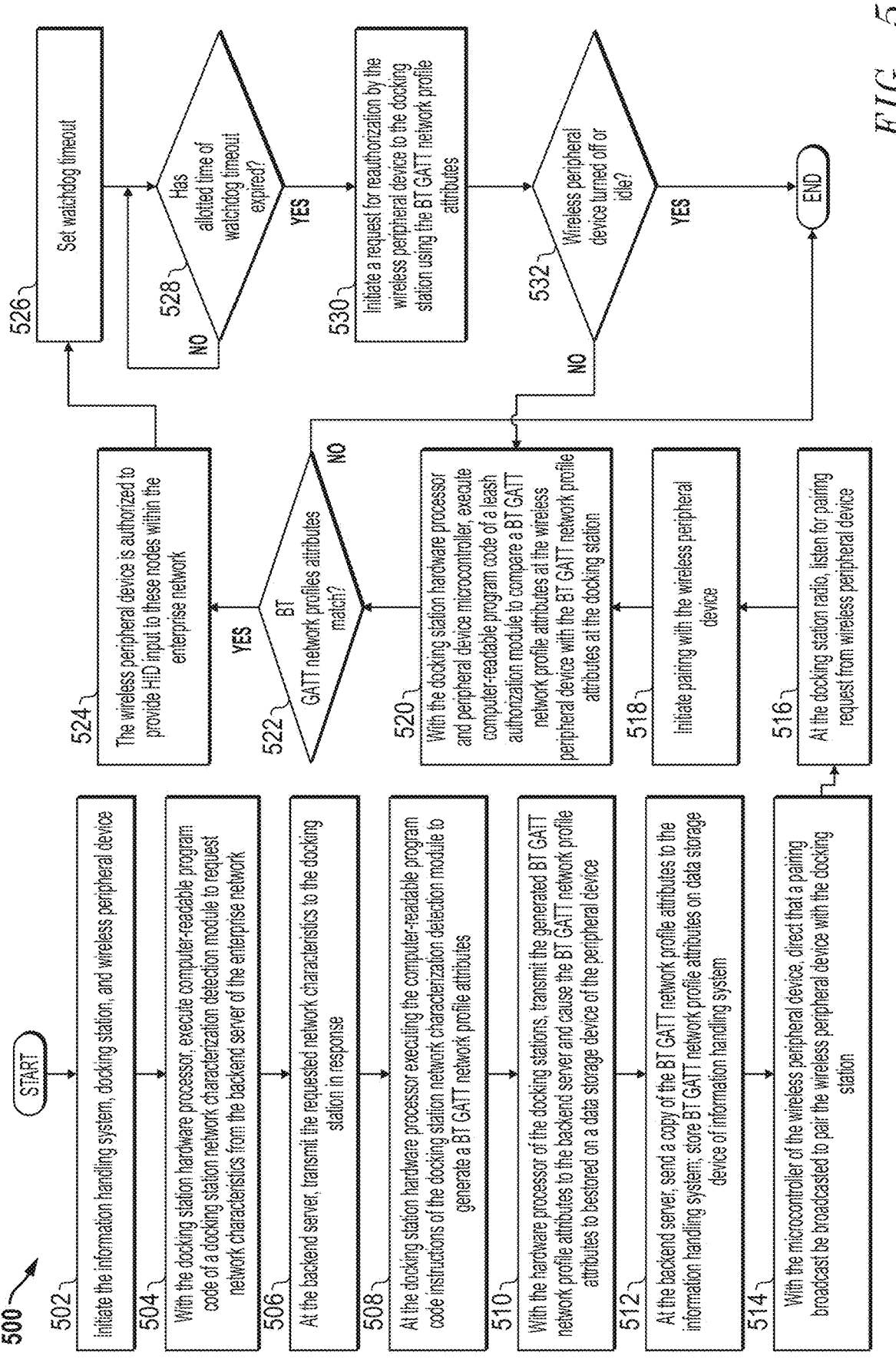
FIG. 5 is a flowchart showing a method of leashing a wireless peripheral device to an enterprise network node and operably coupling that peripheral device to within the enterprise network according to another embodiment of the present disclosure.

FIG. 5 is a flowchart showing a method 500 of leashing a wireless peripheral device to an enterprise network node and operably coupling that wireless peripheral device to within the enterprise network according to another embodiment of the present disclosure. In an embodiment, the method 500 may be conducted for each initial pairing of any wireless peripheral device to the docking station. Leash authorization may occur each time a wireless peripheral device operatively couples, such as when coming out of a time-out mode or turned on, after already paired and leash authorization may occur periodically based on a watchdog timer according to embodiments herein.

At block 502, the method 500 may include initiating an information handling system, a docking station, and a wireless peripheral device. In an embodiment, the docking station may be initiated by a user by actuation a button, switch, or key on the docking station that causes power to be provide to the docking station hardware processor and docking station data storage device as well as other hardware devices of the docking station such as a docking station radio. In an embodiment, the information handling system may be initiated by a user by actuating a button, switch, or key on the information handling system that causes power to be provide to the hardware processor of the information handling system and data storage device as well as other hardware devices of the information handling system such as a wireless interface adapter. Still further, initiation of the wireless peripheral device may similarly include a user actuating a button, switch, or key on the wireless peripheral device that causes power to be provide to the hardware processor such as a microcontroller of the wireless peripheral device and data storage device on the wireless peripheral device as well as other hardware devices of the wireless peripheral device such as a wireless peripheral device radio.

By providing power to the docking station hardware processor, the docking station hardware processor may execute computer-readable program code of a docking station network characterization detection module to, at block 504, request network characteristics from the backend server of the enterprise network. In an embodiment, the communications between the docking station and the backend server, when it is a wireless communication, may be completed using a GATT communication protocol to transmit data requests and data to and from the docking station. In other embodiments, the communications may a wired communication.

In an embodiment, the detected network characteristics may include a domain name and network server gateway address associated with the network. A hardware identification of the docking station may be part of the identifiable network characteristics used to generate a BT GATT network profile attributes as described herein. The BT GATT network profile attributes therefore relates network characteristics from a linked WLAN or wired network to be used as identifiers in a BT GATT network profile attributes for control of communications across a WPAN such as a BT or BLE wireless link requiring pairing according to the Bluetooth® or BLE wireless protocols. The network characteristics may involve a string of values drawn from enterprise network aspects such as a gateway address of a network server (such as the backend server), identifying a domain controller of the enterprise network, a Group Policy Object filter that has been set up and detected, a Security Mode of the enterprise network, or an organizationally unique identifier (OUI) for the enterprise or vendors of server nodes in the enterprise network. In an aspect, a hardware identifier, for the docking station or other node may also be included in some embodiments for additionally granular leashing of a wireless peripheral device within the enterprise network in some embodiments. In an embodiment, the gateway address may be specifically used to leash the wireless peripheral device to the network of the enterprise while the hardware identification of the docking station may be used to leash the wireless peripheral device to a specific workspace operated by the docking station within the enterprise network. At block 506, the backend server may transmit the requested network characteristics to the docking station in response to the request.

The method 500, at block 508, includes the docking station hardware processor executing the computer-readable program code instructions of the docking station network characterization detection module to generate a BT GATT network profile attributes. In an embodiment, the docking station hardware processor may generate the BT GATT network profile attributes by forming a string bytes that include data describing, at least, the gateway address of the network server (e.g., backend server). The string of bytes may also include hardware identifiers such as an identification of the docking station. For further security in some embodiments, the values of network characteristics may be hashed or encrypted using a hashing algorithm at the docking station executing the network characterization module to generate the BT GATT network profile attributes. In an embodiment, the docking station hardware processor may execute any hash algorithm or other cryptographic algorithm to create the unique BT GATT network profile attributes that may be used in the method 500 described herein to determine whether the wireless peripheral device should be allowed to provide HID input to a node device on the network such as the information handling system.

The method 500 further includes the docking station transmitting the generated BT GATT network profile attributes to the backend server at block 510. It is appreciated that instead of transmitting the generated BT GATT network profile attributes to a backend server, the docking station may securely transmit the generated BT GATT network profile attributes to the wireless peripheral device after a pairing request has been broadcasted by the wireless peripheral device for the first time for attachment of the BT GATT network profile attributes as a leash security key to the wireless peripheral device for storage in non-volatile memory. As described herein in some embodiments, however, the backend server may be communicatively coupled to a hardware server of a manufacturer such that the backend server sends a copy of the docking station BT GATT network profile attributes to the manufacturer or to an ITDM in order to upload this copy onto a non-volatile peripheral device storage device after the user has purchased the wireless peripheral devices. By preinstalling the peripheral device BT GATT network profile attributes (e.g., a copy of the docking station BT GATT network profile attributes described herein) to the peripheral device storage devices or during provisioning by an ITDM, the user may receive the wireless peripheral devices shipped to the enterprise and have it operatively coupled to the docking station and leashed to the enterprise as described herein. In an embodiment, this provisioning of the BT GATT network profile attributes to the wireless peripheral device includes the wireless peripheral device storing the BT GATT network profile attributes to a non-volatile data storage on the wireless peripheral device so that it may not be altered without special provisioning software from an ITDM to allow access.

As described herein, in an embodiment, the wireless peripheral device may be provisioned with a copy of the BT GATT network profile attributes at block 510. This BT GATT network profile attributes may be stored on a non-volatile and persistent data storage device of the wireless peripheral device. As described herein, the backend server may provision this BT GATT network profile attributes to a manufacturer of the wireless peripheral device or an ITDM in an embodiment. In an embodiment, the manufacturer may upload a copy of the BT GATT network profile attributes to the non-volatile and persistent data storage device of the wireless peripheral device at a factory where the wireless peripheral device is manufactured. Alternatively, an ITDM may upload the GATT network profile to the non-volatile and persistent data storage device via use of the backend server or other information handling system as described herein for provisioning of the wireless peripheral device during setup upon receiving the wireless peripheral device at the enterprise.

In an embodiment, the backend server may also send a copy of the BT GATT network profile attributes to the information handling system at block 512. Provisioning of the BT GATT network profile attributes, in an embodiment, may allow the information handling system to operate as a node in the enterprise network and provide for operations with the leashed wireless peripheral device. In some embodiments, the leashing of the wireless peripheral device may be to the enterprise via the information handling system according to embodiments described herein for the docking station. Further, the information handling system may obtain network characteristics of the enterprise network on behalf of the docking station when, for example, the docking station is not operatively coupled to the backend server of the enterprise network at the time that the wireless peripheral device is initiated, and the pairing process has started. This is described in connection with FIG. 4, for example. Additionally, at block 512, the BT GATT network profile attributes may be stored on a non-volatile and secure data storage device on the information handling system for later use if necessary.

At block 514, as the wireless peripheral device is initiated, the microcontroller of the wireless peripheral device may direct that a pairing broadcast be broadcasted so as to pair the wireless peripheral device with the docking station. The initiation of the wireless peripheral device may cause the wireless peripheral device PMU to provide power to the wireless peripheral device microcontroller to control the wireless peripheral device radio to broadcast this pairing request. Initiation of the wireless peripheral device may also cause the peripheral device microcontroller to execute code instructions of the peripheral device network characteristic detection module and the leash authorization module to monitor for leashing that may occur from the docking station or for verification of leash authorization for usage of the wireless peripheral device in embodiments herein.

At block 516, the docking station may listen for the pairing beacon and request to pair from the wireless peripheral device. In an embodiment, the docking station may continuously scan for such pairing requests. In another embodiment, a user may actuate a button, switch, or other key on the docking station to cause the docking station to begin to scan for the pairing beacon from the wireless peripheral device. In yet another embodiment, a software trigger may be executed by the hardware processor of the backend server that causes the docking station to be put into a pairing mode. This software trigger may be triggered when, for example, an ITDM accesses the backend server and triggers the event.

When the docking station detects the pairing request from the wireless peripheral device, the docking station may initiate the pairing process by requesting to connect with the wireless peripheral device at block 518. This includes the wireless peripheral device granting that request. Again, in an embodiment, the docking station may communicate, at least initially, with the wireless peripheral device using the GATT communication protocols for setting up pairing under BT or BLE as described herein.

In order to determine whether the wireless peripheral device is allowed to provide HID input to the nodes of the network such as the backend server, the docking station may execute computer-readable program code instructions of the leash authorization module to compare a BT GATT network profile attributes stored on the docking station data storage device to the BT GATT network profile attributes received from the wireless peripheral device at block 520. As described herein, in response to the request for the BT GATT network profile attributes from the wireless peripheral device, the wireless peripheral device responds with their copy of the BT GATT network profile attributes. It is also appreciated that while the docking station is making this comparison, the peripheral device microcontroller may also execute computer-readable program code instructions of a leash authorization module to compare the docking station BT GATT network profile attributes to the peripheral device Bluetooth GATT network profile in order to determine whether the enterprise network is a network to which the wireless peripheral device may not only be paired to but also be operatively coupled to the enterprise network and provide HID input to the node such as the docking station of the enterprise network. In an embodiment, both the docking station and wireless peripheral device may transmit, securely, their GATT network profiles to each other for each device to complete this comparison process. In an alternative embodiment, the docking station hardware processor may complete this comparison process and securely notify the wireless peripheral device, wirelessly via the GATT communication, of the comparison outcome.

In an embodiment, the copy of the docking station BT GATT network profile attributes may be transmitted to the wireless peripheral device by the docking station during an initial and first pairing process using any secure and/or direct communication protocol, such as a directed extended GATT communication, with the wireless peripheral device in order to prevent third-party information handling systems from being capable of receiving the copy of the docking station BT GATT network profile attributes. In an embodiment, the peripheral device microcontroller may execute code instructions of the peripheral device network characterization detection module to store this copy of the docking station BT GATT network profile attributes on a non-volatile and persistent data storage device (e.g., peripheral device storage device) for access by the peripheral device microcontroller during a subsequent pairing and operative coupling of the wireless peripheral device to the docking station. In an embodiment, every time the wireless peripheral device is being operatively coupled to the docking station after the wireless peripheral device has been turned off and then turned back on, for example, this authorization process is conducted with execution of code instructions of the leash authorization module for the comparison of the peripheral device Bluetooth GATT network profile to the docking station BT GATT network profile attributes by both the peripheral device microcontroller and docking station hardware processor.

In an embodiment, at block 522, the docking station hardware processor and/or wireless peripheral device microcontroller, executing the computer-readable program code instructions of the leash authorization module, compares the BT GATT network profile attributes stored on the docking station data storage device to the BT GATT network profile attributes provided wirelessly from the wireless peripheral device.

Where the BT GATT network profile attribute sets at the wireless peripheral device and docking station do not match at block 522, the wireless peripheral device is prevented from sending HID input to the docking station or other node that it is attempting to pair and wirelessly couple with since it cannot be verified as being within the enterprise network. Although the leash authorization is described in this embodiment as being with a node such as the docking station, other nodes such as the information handling system, the backend server, access points, base stations, and any other hardware node may be required to pass leash authorization with a matching BT GATT network profile attributes. If the node does not, the method 500 may end here. In an embodiment, although the wireless peripheral device may be paired with the docking station, the docking station hardware processor may ignore or otherwise not receive HID input data from the wireless peripheral device thereby preventing the wireless peripheral device from being operatively coupled to the enterprise network that it isn't leashed to. Additionally, the wireless peripheral device microcontroller may determine that because the GATT network profiles do not match, the wireless peripheral device is not leashed to the enterprise network node to which the wireless peripheral device is attempting to be operatively coupled and, therefore, it is prevented from providing HID input to the node such as the docking station. The methods and systems described herein, therefore, prevents the use of a wireless peripheral device at an enterprise network to which it is not leashed to as identified by an incorrectly matching GATT network profile or the non-existence of a GATT network profile at a node. Indeed, because the wireless peripheral device is effectively locked from operating when paired with any other device (e.g., a docking station or information handling system) identified as not being part of the network of the enterprise, theft of the wireless peripheral device may be reduced or prevented. Also, because the wireless peripheral device may be wirelessly coupled to any node within the network of the enterprise, the wireless peripheral device may be used by multiple users within the enterprise thereby allowing multiple users to physically move the wireless peripheral device with the enterprise and be operatively coupled to any enterprise network nodes only.

Returning to block 522, where the BT GATT network profile attributes of the wireless peripheral device matches the BT GATT network profile attributes at the docking station, the wireless peripheral device is authorized to provide HID input to these nodes within the enterprise network after the docking station has been paired with the wireless peripheral device at block 518, the method 500 may proceed to block 524. It is appreciated that because the BT GATT network profile attributes is unique to the docking station and the enterprise network, the inclusion of a matching BT GATT network profile attributes at the wireless peripheral device indicates to the docking station and the wireless peripheral device that the wireless peripheral device is trustworthy and is leashed to the enterprise network. The wireless peripheral device may then wirelessly couple to the enterprise network node, such as the docking station, and generate and provide HID input via a BT or BLE wireless link to the docking station or other enterprise node.

Thus, where the pairing process described in connection with blocks 514 through 518 is an initial or first pairing between the wireless peripheral device and the docking station, the GATT network profile may be uploaded, wirelessly, from the docking station to the wireless peripheral device in order to leash the wireless peripheral device to the network via the docking station. In another embodiment, this may be completed by an ITDM in order to set up a workspace that includes the wireless peripheral device on behalf of a user. Where a GATT network profile already exists on the non-volatile and persistent memory device on the wireless peripheral device, the leash authentication process at blocks 520 and 522 may be conducted indicating that this is a subsequent operative coupling of the wireless peripheral device and the authentication via execution of the leash authorization module is required.

In an embodiment, the method 500 may also include, at block 526, the docking station iteratively setting a watchdog timeout. In an embodiment, this watchdog timeout sets a timer such that after an allotted or predetermined amount of time has expired at block 528, the docking station initiates a request for reauthorization at block 530 by the wireless peripheral device to the docking station using the BT GATT network profile attributes.

At block 532, if the wireless peripheral device has not been turned off, is not in standby due to inactivity, or has not been moved out of BT or BLE range and is idle, then the flow may return to processes associated with leash re-authentication at blocks 520 and 522. Where, for example, this reauthorization indicates that the wireless peripheral device does not include the BT GATT network profile attributes that matches that BT GATT network profile attributes stored on the docking station data storage device, the docking station may reject HID input from the, now paired, wireless peripheral device. At this point the method 500 may end. Where, at block 532, the wireless peripheral device has been turned off, is in standby due to inactivity, or has been moved out of BT or BLE range and is idle, then the method 500 may end. Upon start up again, however, the leash authentication of blocks 520 and 522 may occur to authorized HID input from the wireless peripheral device according to embodiments herein.

Figure 6:
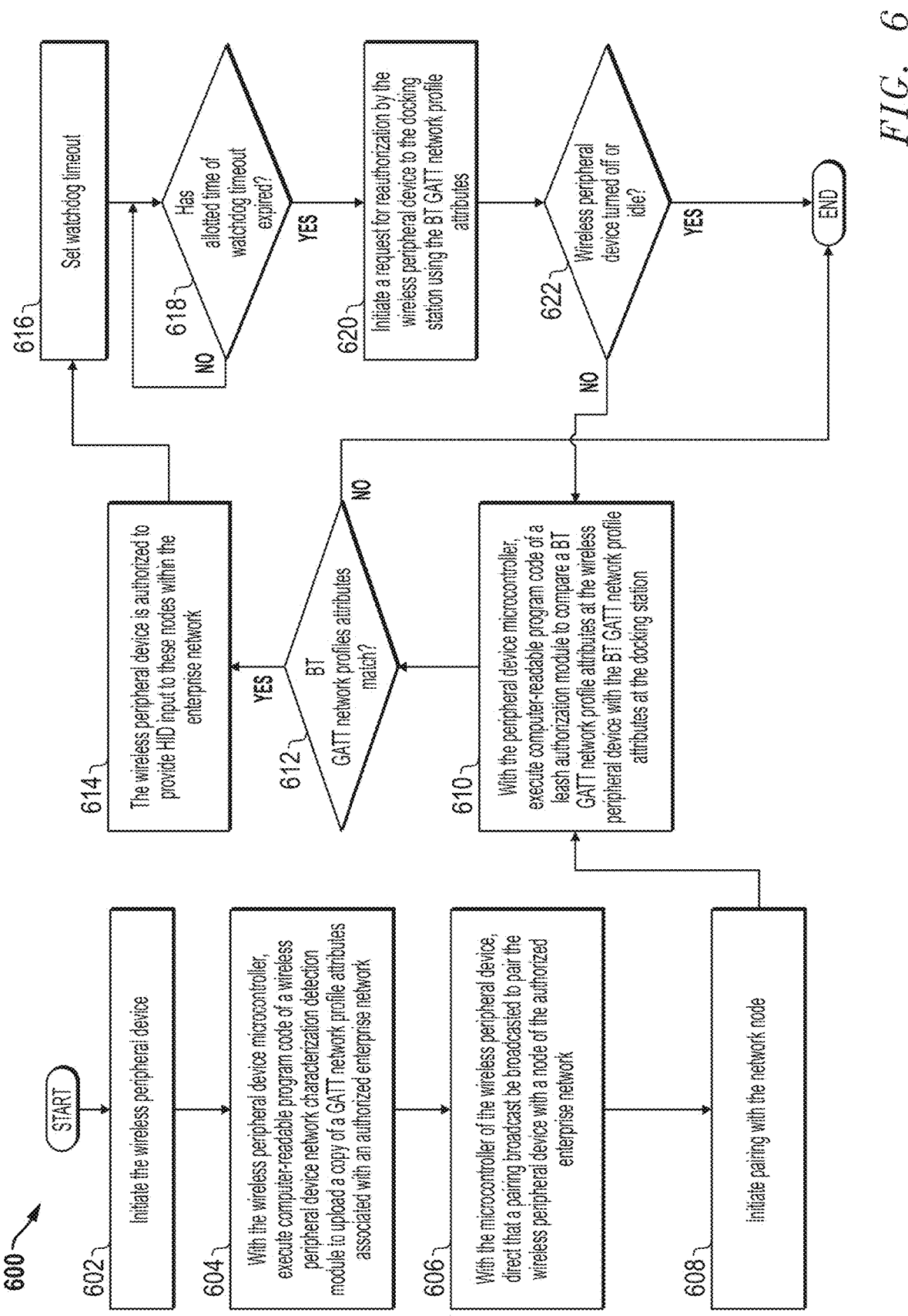
FIG. 6 is a flowchart showing a method of initiating, pairing, and leashing a wireless peripheral device to a node of an enterprise network according to another embodiment of the present disclosure.

FIG. 6 is a flowchart showing a method 600 of initiating, pairing, and leashing a wireless peripheral device to a node of an enterprise network according to another embodiment of the present disclosure. As described herein, the wireless peripheral device may be paired with any node on any network but is prevented from being operatively coupled to non-authorized network nodes (and thereby being allowed to provide HID input to the node) when the wireless peripheral device microcontroller determines, via execution of a leash authorization module, that stored GATT network profiles do not match between the wireless peripheral device and the node.

At block 602, the wireless peripheral device may be initialized. In an embodiment, initiation of the wireless peripheral device may include a user actuating a button, switch, or key on the wireless peripheral device that causes power to be provide to the hardware processor such as a microcontroller of the wireless peripheral device and data storage device on the wireless peripheral device as well as other hardware devices of the wireless peripheral device such as a wireless peripheral device radio.

By providing power to the peripheral device microcontroller, the peripheral device microcontroller may execute computer-readable program code of a peripheral device network characterization detection module to, at block 604, upload a copy of a GATT network profile associated with an authorized enterprise network from a secured GATT communication with the docking station. As described herein, the GATT network profile may come from a secure location such as the docking station described in FIG. 1, or previously been provisioned from a backend server, an authorized node within the enterprise network, and/or the information handling system described in FIG. 1. In an embodiment where the wireless peripheral device has received the GATT network profile from an authorized enterprise network node such as the docking station described herein in the initial pairing of the wireless peripheral device to this authorized enterprise network node or by previous provisioning, this may cause the GATT network profile to be uploaded to a non-volatile and persistent data storage device of the wireless peripheral device. Again, this GATT network profile may be transmitted to the wireless peripheral device using a secure wireless transmission protocol thereby preventing third-party information handling systems from accessing a copy of the GATT network profile. This transmission of the GATT network profile may be completed once during this initial and first pairing of the wireless peripheral device to the authorized enterprise network node or with the wireless peripheral device not requesting a GATT network profile from the authorized enterprise network node when a GATT network profile already exists on the non-volatile and persistent data storage device.

At block 606, after the wireless peripheral device has been initiated, the microcontroller of the wireless peripheral device may direct that a pairing broadcast be broadcasted so as to pair the wireless peripheral device with the authorized enterprise network node. In some embodiments, network leash authorization may need to occur before pairing. In other embodiments, the pairing is conducted under BT or BLE protocols before the network leash authorization described at blocks 610 and 612 below. At block 608, when the wireless peripheral device receives a request to connect from the authorized enterprise network node, the pairing process may be initiated in an attempt to operatively couple the wireless peripheral device to the authorized enterprise network node. If pairing is permitted to proceed, BT or BLE pairing authorization is conducted under BT or BLE protocols according to embodiments herein.

At block 610, in order to determine whether the wireless peripheral device is allowed to provide HID input to the nodes of the network such as the backend server, the docking station, or other authorized enterprise network node described herein, the wireless peripheral device microcontroller may execute computer-readable program code instructions of the leash authorization module to compare a BT GATT network profile attributes stored on and received from the authorized enterprise network node with the BT GATT network profile attributes received at the wireless peripheral device. As described herein, in response to the request for the BT GATT network profile attributes from the wireless peripheral device, the wireless peripheral device responds with their copy of the BT GATT network profile attributes as well for the authorized enterprise network node to complete a similar process as the wireless peripheral device. It is also appreciated that while the authorized enterprise network node is making this comparison, the peripheral device microcontroller is concurrently executing the computer-readable program code instructions of the leash authorization module to compare the docking station BT GATT network profile attributes to the peripheral device Bluetooth GATT network profile in order to determine whether the enterprise network is a network to which the wireless peripheral device may not only be paired to but also be operatively coupled to the enterprise network and provide HID input to the authorized enterprise network node such as the docking station of the enterprise network. In an embodiment, both the authorized enterprise network node and wireless peripheral device may transmit, securely, their GATT network profiles to each other for each device to complete this comparison process. In an alternative embodiment, the authorized enterprise network node may complete this comparison process and notify, wirelessly, the wireless peripheral device of the comparison outcome. If no response is received from the node in this latter embodiment, the peripheral device leash authentication mode determines that the wireless peripheral device may not wireless couple and operate to generate and send HID input data.

In an embodiment, at block 612, the wireless peripheral device microcontroller, executing the computer-readable program code instructions of the leash authorization module, compares or has the comparison be conducted between the BT GATT network profile attributes stored on the docking station data storage device to the BT GATT network profile attributes provided wirelessly from the wireless peripheral device.

Where the BT GATT network profile attribute sets at the wireless peripheral device and docking station do not match at block 612, the wireless peripheral device is prevented from being operatively coupled to the authorized enterprise network node and is prevented from sending HID input to any authorized enterprise network node within the enterprise network such as the docking station, the information handling system, the backend server, access points, base stations, and any other hardware node as described herein. At this point, the method 600 may end here.

In an embodiments herein, although the wireless peripheral device is paired with the authorized enterprise network node, the hardware processor of the authorized enterprise network node may also prevent receiving HID input data from the wireless peripheral device thereby preventing the wireless peripheral device from being operatively coupled to the enterprise network that it isn't leashed to. Additionally, the wireless peripheral device microcontroller may determine that because the GATT network profiles do not match, the wireless peripheral device is not leashed to the enterprise network node to which the wireless peripheral device is attempting to be operatively coupled and, therefore, should not provide HID input to the authorized enterprise network node. This prevents the use of a wireless peripheral device at an enterprise network to which it is not leashed (as identified by an incorrectly matching GATT network profile or the non-existence of a GATT network profile) at a node. Indeed, because the wireless peripheral device is effectively locked from operating when paired with any other authorized enterprise network node (e.g., a docking station or information handling system) identified as not being part of the network of the enterprise, theft of the wireless peripheral device may be reduced or prevented. Also, because the wireless peripheral device may be wirelessly coupled to any node within the network of an authorized enterprise network node, the wireless peripheral device may be used by multiple users within the enterprise thereby allowing multiple users to physically move the wireless peripheral device with the enterprise and be operatively coupled to any enterprise network nodes only authorized in the enterprise network.

At block 612, where the BT GATT network profile attributes of the wireless peripheral device matches the BT GATT network profile attributes at the authorized enterprise network node, the wireless peripheral device is authorized to provide HID input to these nodes within the enterprise network after the authorized enterprise network node has been operatively coupled with the wireless peripheral device at block 608, the method proceeds to block 614. It is appreciated that because the BT GATT network profile attributes is unique to the authorized enterprise network node and the enterprise network, the inclusion of a matching BT GATT network profile attributes at the wireless peripheral device indicates to the authorized enterprise network node and the wireless peripheral device that the wireless peripheral device is trustworthy and is to leashed to the enterprise network. The wireless peripheral device may then wirelessly couple to the enterprise network node, such as the docking station, and generate and provide HID input via a BT or BLE wireless link to the docking station or other enterprise node.

Again, where the pairing process described in connection with blocks 606 and 608 is an initial or first pairing between the wireless peripheral device and the authorized enterprise network node, the GATT network profile may be uploaded, wirelessly, from the docking station to the wireless peripheral device in order to leash the wireless peripheral device to the network via the authorized enterprise network node. In an embodiment, this may be completed by an ITDM in order to set up a workspace that includes the wireless peripheral device on behalf of a user. Where a GATT network profile already exists on the non-volatile and persistent memory device on the wireless peripheral device, the leash authentication process at blocks 610 and 612 may be conducted indicating that this is a subsequent operative coupling of the wireless peripheral device and the authentication via execution of the leash authorization module is required.

In an embodiment, the method 600 may also include, at block 616, the authorized enterprise network node setting a watchdog timeout. In an embodiment, this watchdog timeout sets a timer such that after an allotted or predetermined amount of time has expired at block 618, the docking station initiates a request for reauthorization at block 620 by the wireless peripheral device to the authorized enterprise network node using the BT GATT network profile attributes.

At block 622, if the wireless peripheral device has not been turned off, is not in standby due to inactivity, or has not been moved out of BT or BLE range and is idle, then the flow may return to processes associated with leash reauthentication at blocks 612 and 614. Where, for example, this reauthorization indicates that the wireless peripheral device does not include the BT GATT network profile attributes that matches that BT GATT network profile attributes stored on the docking station data storage device, the wireless peripheral device may block HID input from being generated or transmitted to the, now paired, docking station. At this point the method 600 may end. Where, at block 622, the wireless peripheral device has been turned off, is in standby due to inactivity, or has been moved out of BT or BLE range and is idle, then the method 600 may end. Upon start up again, however, the leash authentication of blocks 612 and 614 may occur to authorized HID input from the wireless peripheral device according to embodiments herein.

The blocks of the flow diagrams of FIGS. 3, 4, 5, and 6, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A docking station for leashing a wireless peripheral device to a network of an enterprise comprising:
   a docking station hardware processor, a docking station data storage device, and a docking station wireless radio to wirelessly couple the docking station to an information handling system and the wireless peripheral device;
   the docking station hardware processor to communicate with a backend server of an enterprise via a network to detect enterprise network characteristics;
   the docking station hardware processor to execute computer-readable program code instructions of a docking station network characterization detection module to generate a generic attribute profile (GATT) network profile based on the detected network characteristics of the enterprise network;
   the docking station hardware processor to execute computer-readable program code of a leash authorization module to compare the GATT network profile to a copy of the GATT network profile stored on a data storage device of the wireless peripheral device and, when the GATT network profile matches the copy of the GATT network profile previously provisioned to and stored on the data storage device of the wireless peripheral device, authorize operative coupling of the docking station to the wireless peripheral device, wherein the wireless peripheral device is leashed to the docking station by requiring that computer-readable program code instructions of a peripheral device leash authorization module be executed by a peripheral device microcontroller to require matching of the GATT network profile at the docking station to the copy of the GATT network profile stored on a non-volatile data storage device of the wireless peripheral device before human interface device (HID) operations can be input into an information handling system operatively coupled to the enterprise network for input controls thereto.

2. The docking station of claim 1 further comprising: the detected network characteristics including a domain name and network server gateway address associated with the enterprise network and a hardware identification of the docking station.

3. The docking station of claim 1, wherein the detected network characteristics includes a string of values drawn from enterprise network such as a gateway address of a network server, identification of a domain controller of the enterprise network, a Group Policy Object filter that has been set up and detected for the enterprise network, a Security Mode of the enterprise network, or an organizationally unique identifier (OUI) for the enterprise in the enterprise network.

4. The docking station of claim 1, wherein the docking station hardware processor communicates with a backend server the GATT network profile generated from detected network characteristics for the enterprise network for uploading a copy of the GATT network profile to the non-volatile data storage device of the wireless peripheral device.

5. The docking station of claim 1 further comprising:
   the docking station initiating a pairing process between the docking station and the wireless peripheral device; and
   the docking station hardware processor to transmit instructions to the wireless peripheral device upon an initial pairing to direct that the wireless peripheral device be leashed to the docking station by requiring that computer-readable program code instructions of a leash authorization module be executed by a peripheral device microcontroller requiring the matching of the GATT network profile at the docking station to the copy of the GATT network profile previously provisioned to and stored on a data storage device of the wireless peripheral device indicating before human interface device (HID) operations can be performed with the information handling system operatively coupled to the network.

6. The docking station of claim 1, wherein when the GATT network profile does not match the wireless peripheral device-stored GATT network profile, the docking station hardware processor prevents human interface device (HID) operations from being received as input from the wireless peripheral device.

7. The docking station of claim 1, wherein when the GATT network profile does not match the wireless peripheral device-stored GATT network profile, the wireless peripheral device is prevented from providing human interface device (HID) input wirelessly, and wherein when the GATT network profile does match the wireless peripheral device-stored GATT network profile, the wireless peripheral device wirelessly couples to provide human interface device (HID) input wirelessly.

8. The docking station of claim 1 further comprising:
   the docking station hardware processor to execute computer-readable program code of a docking station network characterization detection module to operatively couple the docking station to the backend server to detect network characteristics of the enterprise network and determine if the docking station is operatively coupled to a backend server of the enterprise network by determining:
      that the backend server is a domain controller;
      that the backend server is executing computer-readable program code instructions of a group policy object (GPO) filter;
      that a security mode associated with the backend server is an enterprise-grade security mode; or an organizationally unique identifier (OUI) used to uniquely identify a manufacturer of network information handling systems within the enterprise network.

9. A method of leashing a wireless peripheral device to a network of an enterprise comprising:

executing computer-readable program code instructions of a network characterization detection module, via a hardware processor of an enterprise information handling system to:

communicate with a backend server of an enterprise via a network and detect network characteristics; and generate a generic attribute profile (GATT) network profile based on the detected network characteristics;

transmitting a request to pair with a wireless peripheral device and executing computer-readable program code instructions of a leash authorization module to compare the GATT network profile to a copy of the GATT network profile previously provisioned to and stored on a data storage device of the wireless peripheral device and, when the GATT network profile matches the copy of the GATT network profile stored on the data storage device of the wireless peripheral device, authorize operative coupling of the docking station to the wireless peripheral device; and transmitting instructions to the wireless peripheral device directing that the wireless peripheral device be leashed to the docking station by requiring that computer-readable program code instructions of a leash authorization module be executed by a peripheral device microcontroller requiring the matching of the GATT network profile at the enterprise information handling system to the copy of the GATT network profile stored on a non-volatile data storage device of the wireless peripheral device before human interface device (HID) operations can be input into the enterprise information handling system operatively coupled to the enterprise network for input controls of the enterprise information handling system.

10. The method of claim 9, wherein the detected network characteristics includes a string of values drawn from the enterprise network such as a gateway address of a network server, identification of a domain controller of the enterprise network, a Group Policy Object filter that has been set up and detected for the enterprise network, a Security Mode of the enterprise network, or an organizationally unique identifier (OUI) for the enterprise in the enterprise network.

11. The method of claim 9 further comprising:

establishing a secured Bluetooth® wireless connection, with the enterprise information handling system processor, to the wireless peripheral device to transmit the GATT network profile via an extended directed GATT communication with the enterprise node for storage of the GATT network profile in the non-volatile data stored device of the wireless peripheral device to leash the wireless peripheral device.

12. The method of claim 9 further comprising:

communicating the GATT network profile to the backend server for a manufacturer to upload the copy of the GATT network profile to the non-volatile data storage device of the peripheral device at a factory where the wireless peripheral device is manufactured.

13. The method of claim 9 wherein, when the GATT network profile does not match the wireless peripheral device-stored GATT network profile, preventing human interface device (HID) operations, via the enterprise information handling system hardware processor, from being received as input from the wireless peripheral device.

14. The method of claim 9, wherein when the GATT network profile does not match the wireless peripheral device-stored GATT network profile, the wireless peripheral device is prevented from providing human interface device (HID) input wirelessly, and wherein when the GATT network profile does match the wireless peripheral device-stored GATT network profile, the wireless peripheral device wirelessly couples to provide human interface device (HID) input wirelessly.

15. The method of claim 9 further comprising:

initiating, with the enterprise node hardware processor, a timer to determine when an allotted time has passed such that when the allotted time has passed the enterprise information handling system hardware processor reinitiates an authorization between the enterprise node and wireless peripheral device by comparing the GATT network profile at the enterprise information handling system and the copy of the GATT network profile at the wireless peripheral device.

16. A docking station for leashing a wireless peripheral device to of an enterprise network comprising:

a docking station hardware processor, a docking station data storage device, and a docking station wireless radio to wirelessly couple the docking station to an information handling system and the wireless peripheral device;

the docking station hardware processor to communicate with the information handling system operatively coupled to a backend server of an enterprise, the docking station to direct the information handling system to detect network characteristics for the enterprise network;

the docking station hardware processor to receive the network characteristics for the enterprise network from the information handling system and execute computer-readable program code instructions of a docking station network characterization detection module to generate a generic attribute profile (GATT) network profile based on the detected network characteristics;

the docking station hardware processor to transmit a request to pair with the wireless peripheral device and to execute computer-readable program code of a leash authorization module to compare the GATT network profile to a copy of the GATT network profile previously provisioned to and stored on a non-volatile data storage device of the wireless peripheral device and, when the GATT network profile matches the copy of the GATT network profile stored on the data storage device of the wireless peripheral device, authorize operative coupling of the docking station to the wireless peripheral device; and transmitting instructions to the wireless peripheral device directing that the wireless peripheral device be leashed to the docking station by requiring that computer-readable program code instructions of a leash authorization module be executed by a peripheral device microcontroller requiring the matching of the GATT network profile at the docking station to the copy of the GATT network profile stored on a data storage device of the wireless peripheral device before human interface device (HID) operations can be input into the information handling system operatively coupled to the enterprise network for input controls.

17. The docking station of claim 16 further comprising:

the detected network characteristics including a domain name and network server gateway address associated with the enterprise network and a hardware identification of the docking station.

18. The docking station of claim 16, wherein when the GATT network profile does not match the wireless peripheral device-stored GATT network profile, the docking station hardware processor prevents human interface device (HID) operations from being received as input from the wireless peripheral device.

19. The docking station of claim 16, wherein when the GATT network profile does not match the wireless peripheral device-stored GATT network profile, the wireless peripheral device is prevented from providing HID input wirelessly, and wherein when the GATT network profile does match the wireless peripheral device-stored GATT network profile, the wireless peripheral device wirelessly couples to provide human interface device (HID) input wirelessly.

20. The docking station of claim 16, wherein the detected network characteristics includes a string of values drawn from enterprise network such as a gateway address of a network server, identification of a domain controller of the enterprise network, a Group Policy Object filter that has been set up and detected for the enterprise network, a Security Mode of the enterprise network, or an organizationally unique identifier (OUI) for the enterprise in the enterprise network.

\*   \*   \*   \*   \*